(12) United States Patent
Kim et al.

(10) Patent No.: US 9,898,207 B2
(45) Date of Patent: Feb. 20, 2018

(54) STORAGE DEVICE

(71) Applicant: SAMSUNG ELECTRONICS CO., LTD., Suwon-si (KR)

(72) Inventors: Dong Kim, Hwaseong-si (KR); Nam Wook Kang, Hwaseong-si (KR); Han Shin Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 15/131,757

(22) Filed: Apr. 18, 2016

(65) Prior Publication Data

US 2017/0003889 A1    Jan. 5, 2017

(30) Foreign Application Priority Data

Jul. 1, 2015    (KR) .................. 10-2015-0094142

(51) Int. Cl.
G06F 12/00    (2006.01)
G06F 3/06     (2006.01)

(52) U.S. Cl.
CPC .......... *G06F 3/0611* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | |
|---|---|---|
| 7,050,959 B1 | 5/2006 | Pollard, II et al. |
| 7,144,152 B2 | 12/2006 | Rusu et al. |
| 7,487,012 B2 | 2/2009 | Bose et al. |
| 7,553,075 B2 | 6/2009 | Hsu et al. |
| 7,679,133 B2 | 3/2010 | Son et al. |
| 7,958,280 B2 | 6/2011 | Salessi et al. |
| 8,095,818 B2 | 1/2012 | Jorgenson et al. |
| 8,553,466 B2 | 10/2013 | Han et al. |
| 8,559,235 B2 | 10/2013 | Yoon et al. |
| 8,566,511 B2 | 10/2013 | Tootoonchian et al. |
| 8,601,300 B2 | 12/2013 | Anderson et al. |
| 8,654,587 B2 | 2/2014 | Yoon et al. |
| 8,694,719 B2 | 4/2014 | Lassa et al. |
| 8,725,957 B2 | 5/2014 | Eleftheriou et al. |
| 8,762,789 B2 | 6/2014 | Lund et al. |
| 8,768,666 B2 | 7/2014 | Anderson et al. |
| 8,806,165 B2 | 8/2014 | Selfin et al. |

(Continued)

OTHER PUBLICATIONS

Bhavani P. Dewan-Sandur et al., "Thermal Management of Die Stacking Architecture That Includes Memory and Logic Processor", 2006 Electronic Components and Technology Conference, 1-4244-0152-Jun. 6, 2006 IEEE, pp. 1963-1968.

(Continued)

*Primary Examiner* — John A Lane
(74) *Attorney, Agent, or Firm* — Sughrue Mion, PLLC

(57) ABSTRACT

A storage device is provided. The storage device includes storage clusters, and a controller. The controller receives a command and an address from an external host device, selects a storage cluster according to the received address, and transmits the received command and the received address to the selected storage cluster. The controller controls the storage clusters as normal storage clusters and slow storage clusters according to a temperature of a zone to which the storage clusters belong.

20 Claims, 18 Drawing Sheets

(56) References Cited

U.S. PATENT DOCUMENTS

| | | |
|---|---|---|
| 2005/0180488 A1 | 8/2005 | Rusu et al. |
| 2008/0043808 A1 | 2/2008 | Hsu et al. |
| 2008/0103634 A1 | 5/2008 | Santos et al. |
| 2008/0140883 A1 | 6/2008 | Salessi et al. |
| 2008/0162779 A1* | 7/2008 | Morris ................ G06F 3/061 711/100 |
| 2008/0263382 A1 | 10/2008 | Jorgenson et al. |
| 2008/0281476 A1 | 11/2008 | Bose et al. |
| 2009/0121271 A1 | 5/2009 | Son et al. |
| 2009/0228637 A1 | 9/2009 | Moon et al. |
| 2011/0072209 A1 | 3/2011 | Lund et al. |
| 2011/0216603 A1 | 9/2011 | Han et al. |
| 2011/0233648 A1 | 9/2011 | Seol et al. |
| 2012/0030415 A1 | 2/2012 | Selfin et al. |
| 2012/0051143 A1 | 3/2012 | Yoon et al. |
| 2012/0179441 A1 | 7/2012 | Anderson et al. |
| 2012/0239855 A1 | 9/2012 | Tootoonchian et al. |
| 2012/0297128 A1 | 11/2012 | Eleftheriou et al. |
| 2012/0331207 A1 | 12/2012 | Lassa et al. |
| 2013/0073822 A1 | 3/2013 | Sandel et al. |
| 2013/0073875 A1 | 3/2013 | Anderson et al. |
| 2013/0080679 A1 | 3/2013 | Bert |
| 2013/0080680 A1 | 3/2013 | Chu |
| 2013/0119527 A1 | 5/2013 | Luo et al. |
| 2013/0198439 A1 | 8/2013 | Kurotsuchi et al. |
| 2013/0275665 A1 | 10/2013 | Saraswat et al. |
| 2013/0279262 A1 | 10/2013 | Yoon et al. |
| 2013/0286595 A1 | 10/2013 | Lisk et al. |
| 2013/0305067 A1 | 11/2013 | Lefurgy et al. |
| 2014/0136769 A1 | 5/2014 | Franceschini et al. |
| 2014/0140156 A1 | 5/2014 | Shoemaker et al. |
| 2014/0181545 A1 | 6/2014 | Shrall et al. |
| 2014/0240913 A1* | 8/2014 | Vyshetsky ............ G06F 1/206 361/679.31 |
| 2014/0289458 A1* | 9/2014 | Lassa ................ G06F 3/0619 711/103 |
| 2014/0306335 A1 | 10/2014 | Mataya et al. |
| 2015/0143026 A1* | 5/2015 | Reddy ................ G06F 3/0616 711/103 |
| 2016/0313943 A1* | 10/2016 | Hashimoto ............ G06F 3/061 |

OTHER PUBLICATIONS

Qi Wu et al., "Exploiting Heat-Accelerated Flash Memory Wear-Out Recovery to Enable Self-Healing SSDs" ECSE Department, Rensselaer Polytechnic Institute (RPI), USA, HotStorage'11 Proceedings of the 3rd USENIX conference on Hot topics in storage and file systems, 5 Pages Total, 2011.

* cited by examiner

FIG. 4

| Slow Scheme | Description |
|---|---|
| S1 | Decrease frequency of storage clusters of slow cluster zone |
| S2 | Migrate hot data in storage clusters of slow cluster zone to storage clusters of normal cluster zone |
| S3 | Remap LBA of write request corresponding to a storage cluster in the slow cluster zone with a LBA of a storage cluster in a normal cluster zone |

| Cluster Zone | Storage Cluster | LBA |
|---|---|---|
| Z1 (Slow Cluster Zone) | 111a | 0~999 |
| | 112a | 1000~1999 |
| Z2 | 113a | 2000~2999 |
| | 114a | 3000~3999 |
| Z3 | 115a | 4000~4999 |
| | 116a | 5000~5999 |
| | 117a | 6000~6999 |

MT1(112a)

| LBA | PBA | Valid Mark |
|---|---|---|
| 1000~1199 | 0~199 | V |
| 1200~1399 | 200~399 | V |
| 1400~1599 | 400~599 | V |
| 1600~1799 | 600~799 | - |
| 1800~1999 | 800~999 | - |

MT1(117a)

| LBA | PBA | Valid Mark |
|---|---|---|
| 6000~6199 | 0~199 | V |
| 6200~6399 | 200~399 | - |
| 6400~6599 | 400~599 | - |
| 6600~6799 | 600~799 | - |
| 6800~6999 | 800~999 | - |

FIG. 6

| Cluster Zone | Storage Cluster | LBA |
|---|---|---|
| Z1 (Slow Cluster Zone) | 111a | 0~999 |
| | 112a | 1000~1599<br>1800~1999<br>6200~6399 |
| Z2 | 113a | 2000~2999 |
| | 114a | 3000~3999 |
| | 115a | 4000~4999 |
| Z3 | 116a | 5000~5999 |
| | 117a | 1600~1799<br>6000~6199<br>6400~6999 |

MT2

| LBA | PBA | Valid Mark |
|---|---|---|
| 1000~1199 | 0~199 | V |
| 1200~1399 | 200~399 | V |
| 1400~1599 | 400~599 | V |
| 6200~6399 | 600~799 | — |
| 1800~1999 | 800~999 | — |

MT1(112a)

| LBA | PBA | Valid Mark |
|---|---|---|
| 6000~6199 | 0~199 | V |
| 1600~1799 | 200~399 | V |
| 6400~6599 | 400~599 | — |
| 6600~6799 | 600~799 | — |
| 6800~6999 | 800~999 | — |

| Cluster Zone | Storage Cluster | LBA |
|---|---|---|
| Z1 (Slow Cluster Zone) | 111a | 0~999 |
| | 112a | 1000~1399<br>1800~1999<br>6200~6399 |
| Z2 | 113a | 2000~2999 |
| | 114a | 3000~3999 |
| | 115a | 4000~4999 |
| Z3 | 116a | 5000~5999 |
| | 117a | 1400~1799<br>6000~6199<br>6600~6999 |

MT2

| LBA | PBA | Valid Mark |
|---|---|---|
| 1000~1199 | 0~199 | V |
| 1200~1399 | 200~399 | V |
| 6400~6599 | 400~599 | - |
| 6200~6399 | 600~799 | - |
| 1800~1999 | 800~999 | - |

MT1(112a)

| LBA | PBA | Valid Mark |
|---|---|---|
| 6000~6199 | 0~199 | V |
| 1600~1799 | 200~399 | V |
| 1400~1599 | 400~599 | V |
| 6600~6799 | 600~799 | - |
| 6800~6999 | 800~999 | - |

MT1(117a)

FIG. 17
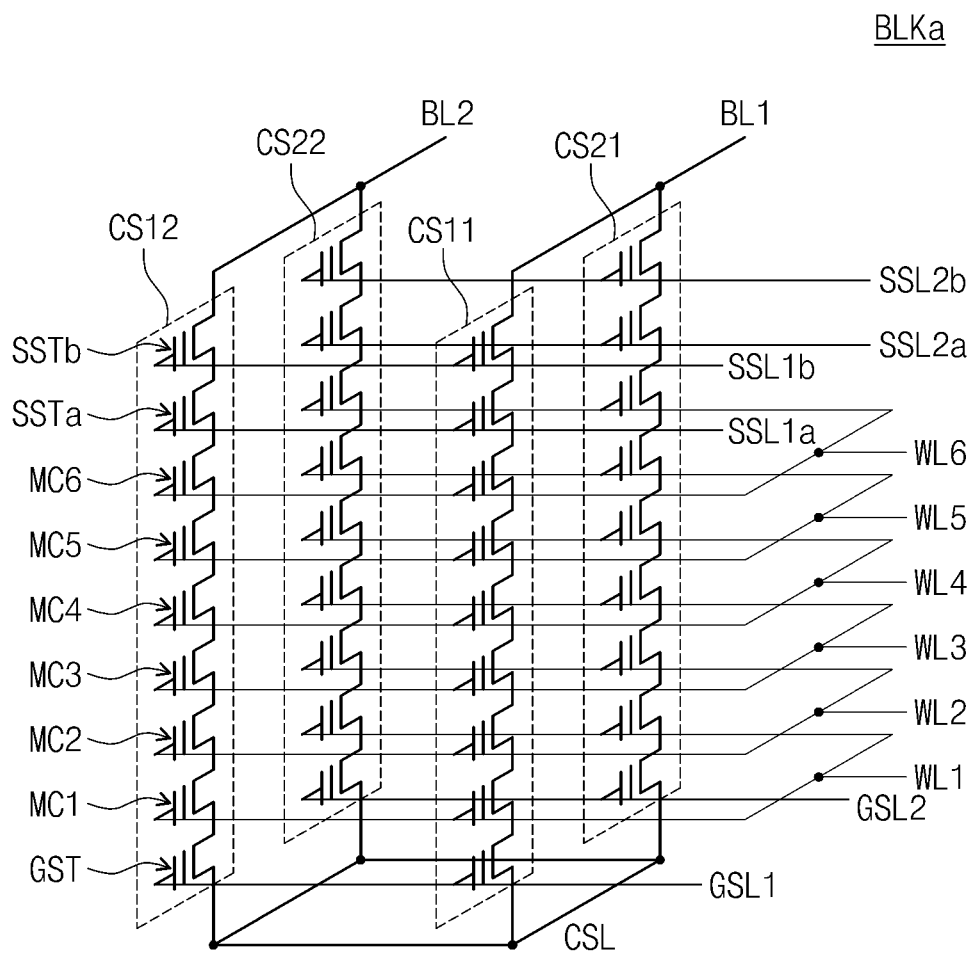
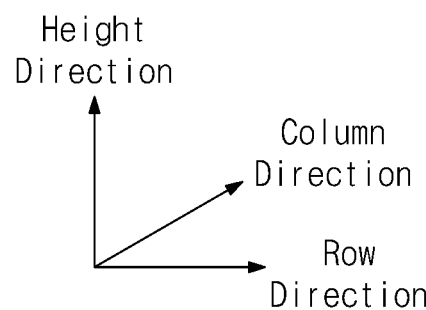

STORAGE DEVICE

CROSS-REFERENCE TO RELATED APPLICATIONS

This application claims priority from Korean Patent Application No. 10-2015-0094142, filed on Jul. 1, 2015, the entirety of which is hereby incorporated by reference.

BACKGROUND

Apparatuses and devices consistent with the present disclosure relate to storage devices and, more particularly, to a storage device including nonvolatile memory devices.

A storage device is a device that stores data according to the control of a host device such as a computer, a smartphone, and a smart pad. Examples of storage devices include a device that stores data on a magnetic disk such as a hard disk drive (HDD) and a device that stores data in a semiconductor memory (e.g., a nonvolatile memory such as a solid state drive (SSD) or a memory card).

Examples of nonvolatile memory devices include a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like.

With the advance in semiconductor manufacturing technology, an operating speed of a host device such as a computer, a smartphone, and a smart pad communicating with a storage device is being improved. In addition, the capacity of contents used in a storage device and a host device of the storage device is increasing. Accordingly, there is an on-going demand for a storage device with improved operating speed.

SUMMARY

One or more exemplary embodiments provide storage devices with improved speed.

According to an aspect of an exemplary embodiment, there is provided a storage device including storage clusters; and a controller configured to receive a command and an address from an external host device, select one of the storage clusters according to the received address, and transmit the received command and the received address to the selected storage cluster, wherein the controller is configured to control the storage clusters as normal storage clusters and slow storage clusters according to a temperature of a zone to which the storage clusters belong.

According to another aspect of an exemplary embodiment, there is provided a storage device including storage clusters; and a controller configured to receive a command and an address from an external host device, select one of the storage clusters according to the received address, and transmit the received command and the received address to the selected storage cluster, wherein each of the storage clusters comprises nonvolatile memory devices; and a cluster controller configured to translate the address received from the controller into a physical address of a nonvolatile memory device of the nonvolatile memory devices and to access the nonvolatile memory device indicated by the physical address in response to the command, and wherein the controller is configured to divide the storage controllers into zones, control at least one storage cluster belonging to a zone as a slow storage cluster when temperature of the zone is greater than or equal to a threshold temperature, and control at least one storage cluster belonging to a zone as a normal storage cluster when the temperature of the zone is less than the threshold temperature.

According to an aspect of another exemplary embodiment, there is provided an operating method of a storage device including a controller and storage clusters each including nonvolatile memory devices and a cluster controller, the operating method including collecting temperatures of the storage clusters and controlling the storage clusters as normal storage clusters and slow storage clusters according to the collected temperatures.

According to an aspect of another exemplary embodiment, there is provided a storage device comprising a plurality of storage clusters arranged in a plurality of cluster zones; and a controller configured to monitor a temperature of each cluster zone to detect a hot cluster zone, and to control at least one storage cluster belonging to the hot cluster zone as a slow storage cluster.

BRIEF DESCRIPTION OF THE DRAWINGS

The foregoing and other aspects will be apparent from the more particular description of non-limiting exemplary embodiments, as illustrated in the accompanying drawings in which like reference characters refer to like parts throughout the different views. The drawings are not necessarily to scale, emphasis instead being placed upon illustrating principles of inventive concepts. In the drawings:

FIG. 4 is a table illustrating an example of slow schemes by which a controller controls a slow storage cluster;

FIGS. 5 to 7 illustrate a procedure of executing a third scheme of the slow schemes illustrated in FIG. 4;

FIG. 17 is a circuit diagram of a memory block according to exemplary embodiments;

DETAILED DESCRIPTION

Figure 1:
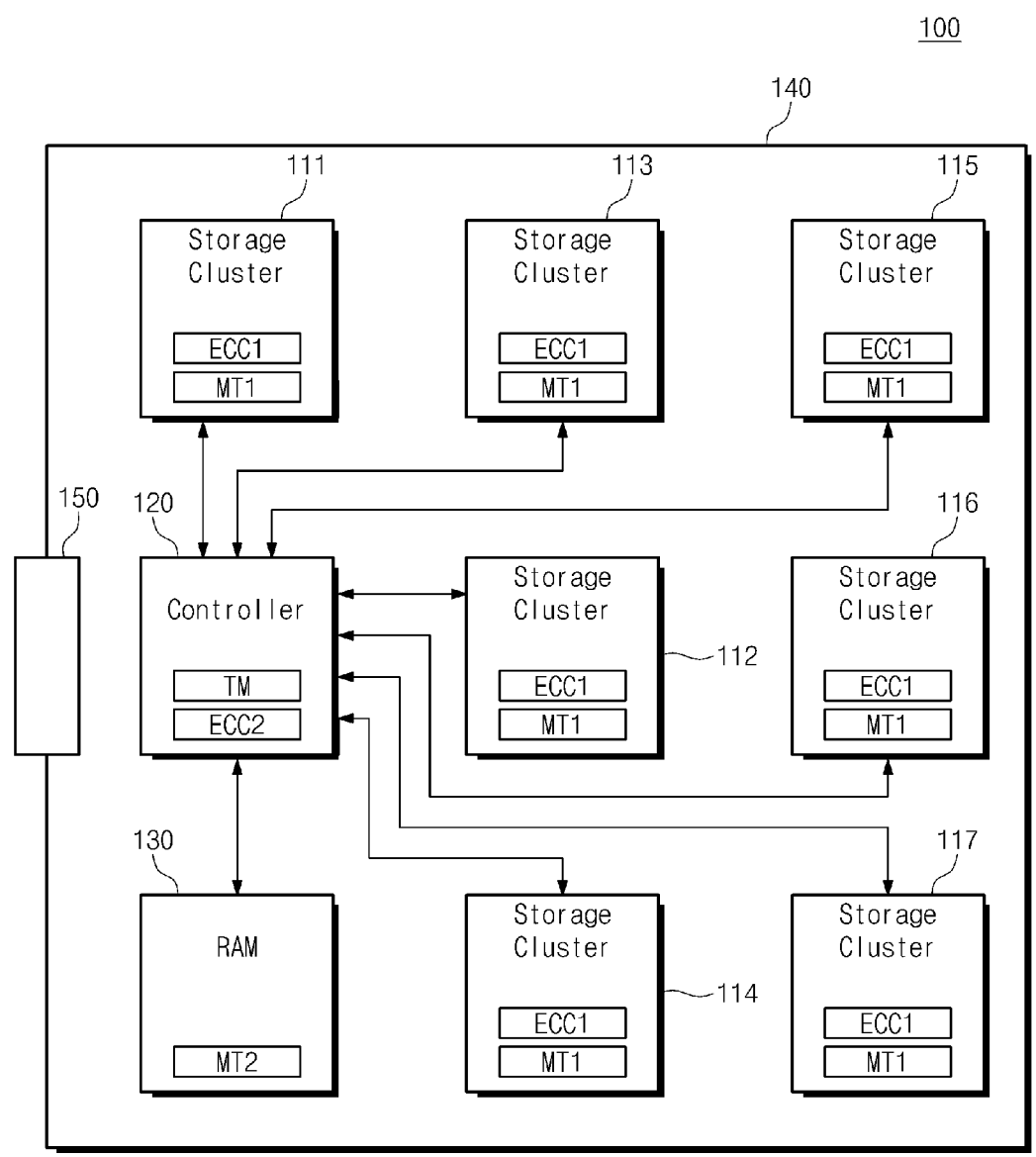
FIG. 1 is a block diagram of a storage device according to exemplary embodiments.

Exemplary embodiments will now be described more fully with reference to the accompanying drawings, in which some exemplary embodiments are shown. Exemplary embodiments, may, however, be embodied in many different forms and should not be construed as being limited to the exemplary embodiments set forth herein; rather, these exemplary embodiments are provided so that this disclosure will be thorough and complete, and will fully convey the scope of exemplary embodiments to those of ordinary skill in the art. In the drawings, the thicknesses of layers and regions are exaggerated for clarity. Like reference characters and/or numerals in the drawings denote like elements, and thus their description may be omitted.

FIG. 1 is a block diagram of a storage device 100 according to exemplary embodiments. As illustrated, the storage device 100 includes storage clusters 111 to 117, a controller 120, a random access memory (RAM) 130, a printed circuit board (PCB) 140, and a connector 150. The storage clusters 111 to 117, the controller 120, the RAM 130, and the connector 150 may be provided on the PCB 140.

The storage clusters 111 to 117 may perform write, read, and erase operations according to the control of the controller 120. Each of the storage clusters 111 to 117 may receive a command and an address from the controller 120 through an input/output channel. Each of the storage clusters 111 to 117 may exchange data with the controller 120 through the input/output channel.

Each of the storage clusters 111 to 117 may exchange a control signal with the controller 120 through the input/output channel. For example, each of the storage clusters 111 to 117 may receive, from the controller 120, a chip enable signal /CE to indicate whether a storage cluster is selected as an access target by the controller 20, a command latch enable signal CLE to indicate that a signal received from the controller 120 through an input/output channel is a command, an address latch enable signal ALE to indicate that a signal received from the controller 120 through an input/output channel is an address, a read enable signal /RE generated by the memory controller 120 during a read operation and periodically toggled to be used to set timings, a write enable signal /WE enabled by the memory controller 120 when the command or the address is transmitted, a write protection signal /WP enabled by the memory controller 120 to limit (and/or prevent) an unintentional write or erase operation when power changes, and a data strobe signal DQS generated by the memory controller 120 during a write operation and periodically toggled to be used to set input synchronization of the data transmitted through the input/output channel. For example, each of the storage clusters 111 to 117 may output, to the memory controller 120, a ready/busy signal R/nB to indicate that a storage cluster is performing a program, erase or read operation and a data strobe signal DQS generated from the read enable signal /RE by each of the storage clusters 111 to 117 and toggled to be used to set output synchronization of data.

Each of the storage clusters 111 to 117 includes a first error correction code block ECC1 and a first mapping table MT1. Each of the storage clusters 111 to 117 may encode write data using the first error correction code block ECC1. Each of the storage clusters 111 to 117 may decode read data using the first error correction code block ECC1. The first error correction code block ECC1 may perform encoding and decoding operations using at least one of various error management algorithms, such as Bose-Chaudhuri-Hocquenghem (BCH) code, Reed-Solomon code, Hamming code, Turbo code, Polar code, and low-density parity check (LDPC) code, etc.

Each of the storage clusters 111 to 117 may perform address mapping using the first mapping table MT1. For example, each of the storage clusters 111 to 117 may translate an address received from the controller 120, e.g., a logical address LBA into a physical address PBA using the first mapping table MT1. The physical address PBA may be an address assigned to a physical storage area in each of the storage clusters 111 to 117. According to a request of the controller 120, each of the storage clusters 111 to 117 may access a storage area that the physical address indicates. In exemplary embodiments, seven storage clusters 111 to 117 are shown in FIG. 1. However, the number of storage clusters provided in the storage device 100 is not limited thereto, and may be greater or fewer than seven.

The controller 120 is configured to control the storage clusters 111 to 117. For example, the controller 120 may control the storage clusters 111 to 117 through an input/output channel and a control channel such that the storage clusters 111 to 117 perform a write, read or erase operation.

The controller 120 is connected to an external host device through the connector 150. The controller 120 may control the storage clusters 111 to 117 according to the control of the external host device. For example, the controller 120 may communicate with the external host device according to a format different from a format to communicate with the storage clusters 111 to 117. A data unit of communication of the controller 120 with the storage clusters 111 to 117 may be different from that of communication of the controller 120 with the external host device.

The controller 120 may use the RAM 130 as a buffer memory, a cache memory and/or a working memory. The controller 120 may store data or a code for managing the storage clusters 111 to 117 in the RAM 130. For example, the controller 120 may be driven by reading the data or the code for managing the storage clusters 111 to 117 from the storage clusters 111 to 117 and loading the read data or code in the RAM 130.

For example, the controller 120 may load a second mapping table MT2 in the RAM 130. The controller 120 may select one of the storage clusters 111 to 117 based on the address received from the external host device, e.g., the logical address LBA, and the second mapping table MT2. For example, the range of a logical address may be assigned to the storage device 100 by the external host device. The controller 120 may divide the assigned range of the logical address and assign the divided range to the storage clusters 111 to 117. Division and assignment information of logical addresses may be included in the second mapping table MT2. When the logical address LBA and the access request are received from the external host device, the controller 120 may select an access target among the storage clusters 111 to 117 using the second mapping table MT2.

The controller 120 includes a temperature manager TM and a second error correction code block ECC2. The controller 120 may encode write data to be transmitted to the storage clusters 111 to 117 using the second error correction code block ECC2. The controller 120 may decode read data received from the storage clusters 111 to 117 using the second error correction code block ECC2. The second error correction code block ECC2 may perform encoding and decoding operations using at least one of various error management algorithms, such as Bose-Chaudhuri-Hocquenghem (BCH) code, Reed-Solomon code, Hamming code, Turbo code, Polar code, and low-density parity check (LDPC) code, etc.

The controller 120 may perform thermal leveling of the storage clusters 111 to 117 using the temperature manager TM. For example, the controller 120 may set hot storage clusters among the storage clusters 111 to 117 to slow storage clusters operating in a low-speed mode using the temperature manager TM. The controller 120 may set non-hot storage clusters among the storage clusters 111 to 117 to normal storage clusters operating in a normal mode. Since only hot storage clusters among the storage clusters 111 to 117 are controlled as slow storage clusters, heating may be prevented and speed of the storage device 100 may be ensured.

The RAM 130 may include at least one of various random access memory devices, such as DRAM (Dynamic RAM), SRAM (Static RAM), SDRAM (Synchronous DRAM), PRAM (Phase-change RAM), MRAM (Magnetic RAM), RRAM (Resistive RAM), and FeRAM (Ferroelectric RAM), etc.

In exemplary embodiments, the controller 120 and the storage clusters 111 to 117 may be connected to each other based on a channel and a way. A single channel may include a single data channel and a single control channel. The single channel may include, for example, eight data lines. In some exemplary embodiments, the single control channel may include control lines to transmit the chip enable signal /CE, the command latch enable signal CLE, the address latch enable signal ALE, the read enable signal /RE, the write enable signal /WE, the write protection signal /WP, and the ready and busy signal R/nB.

Storage clusters connected to a single channel may form a way. If n storage clusters are connected to a single channel, an n-way may be formed. Storage clusters belonging to a single way may share data lines and control lines to transmit the command latch enable signal CLE, the address latch enable signal ALE, the read enable signal /RE, the write enable signal /WE, and the write protection signal /WP. Each of the storage clusters belonging to the single way may communicate with the controller 120 through respective control lines to transmit the chip enable signal /CE and the ready and busy signal R/nB.

The controller 120 may alternately access storage clusters of an n-way connected to a single channel. The controller 120 may independently access storage clusters connected to different channels. The controller 120 may alternately or simultaneously access storage clusters connected to different channels.

In exemplary embodiments, storage clusters may be connected to the controller 120 in the form of a wide 10. For example, storage clusters connected to different channels may share a control line of a single chip enable signal /CE. The storage clusters sharing the control line of the single chip enable signal /CE may be accessed at the same time. Since data lines of different channels are used at the same time, a broad input/output bandwidth may be achieved.

The storage device 100 may include a storage module, a solid state drive (SSD) or a hard disk drive (HDD). The storage device 100 may include a person computer memory card international association (PCMCIA) card, a compact flash card (CF), a smart media card (SM or SMC), a memory stick, a multimedia card (MMC, RS-MMC or MMCmicro), an SD card (SD, miniSD, microSD or SDHC), a universal flash storage (UFS). The storage device 1300 may include an embedded memory such as an embedded multimedia card (eMMC), UFS, and perfect page new (PPN).

As shown in FIG. 1, the storage device 100 includes the RAM 130 disposed outside the controller 120. However, rather than the RAM 130 disposed outside the controller 120, the controller 120 may be configured to use an internal RAM as a buffer memory, a working memory and/or a cache memory.

Figure 2:
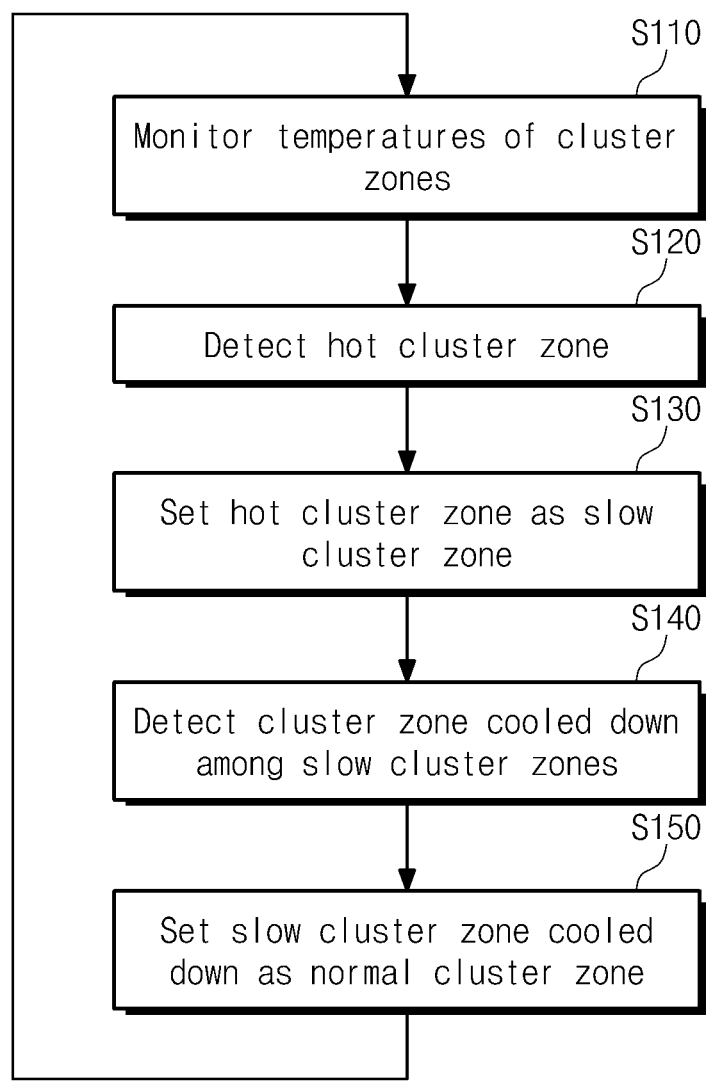
FIG. 2 is a flowchart summarizing an operating method of a storage device according to exemplary embodiments.

FIG. 2 is a flowchart summarizing an operating method of a storage device 100 according to exemplary embodiments. Referring to FIGS. 1 and 2, the controller 120 monitors temperatures of clusters zones (S110). For example, each of the clusters zones may include one or more storage clusters. It is noted that one or more temperature sensors may be included in the storage device 100 for monitoring the temperatures of various storage clusters and/or cluster zones. This will be described in more detail later.

The controller 120 detects a hot cluster zone of the cluster zones (S120). For example, a cluster zone whose temperature is greater than a first threshold value may be detected as a hot cluster zone.

The controller 120 may set a host cluster zone as a slow cluster zone (S130). For example, the controller 120 may limit the operation of storage clusters belonging to the slow cluster zone to reduce a temperature of the slow cluster zone.

The controller 120 may detect a cooled-down cluster zone among the slow cluster zones (S140). For example, when a temperature of a slow cluster zone is less than or equal to a second threshold value, the controller 120 may determine that the slow cluster zone is cooled down. For example, the second threshold value may be less than or equal to the first threshold value.

The controller 120 may set the cooled-down cluster zone as a normal cluster zone (S150). For example, the limitation of the operation of the storage clusters belonging to the cooled-down cluster zone may be released.

In exemplary embodiments, the operation shown in FIG. 2 may be performed periodically or performed when temperature of at least one of the cluster zones is changed to be greater than or equal to a threshold value.

Figure 3:
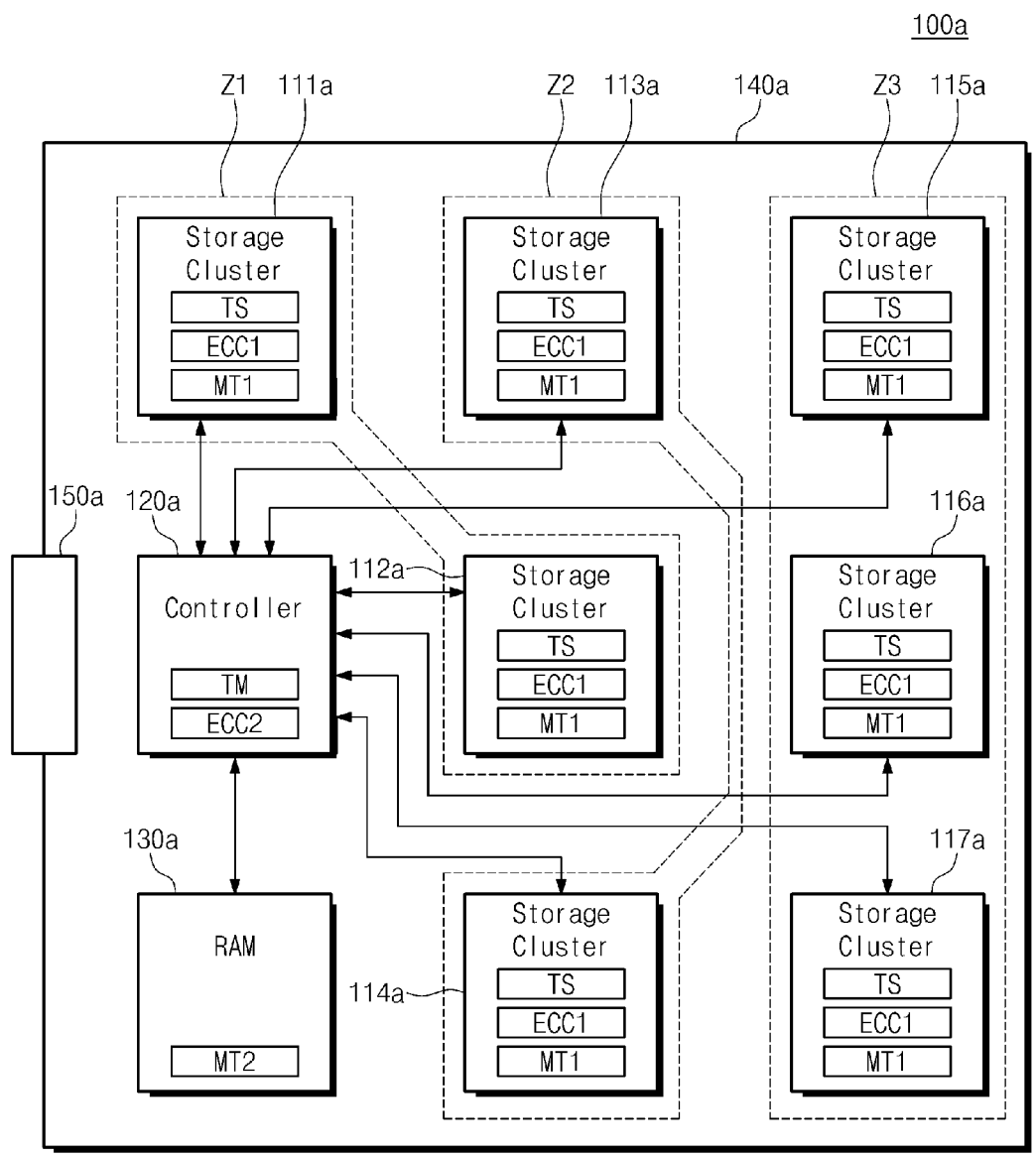
FIG. 3 is a block diagram of a storage device in which cluster zones are divided according to exemplary embodiments.

FIG. 3 is a block diagram of a storage device 100a in which cluster zones are divided according to exemplary embodiments. As illustrated, the storage device 100a includes storage clusters 111a to 117a, a controller 120a, a RAM 130a, a printed circuit board (PCB) 140a, and a connector 150a. Each of the storage clusters 111a to 117a includes a temperature sensor TS, a first error correction code block ECC1, and a first mapping table MT1. The controller 120a includes a temperature manager TM and a second error correction code block ECC2. A second mapping table MT2 may be loaded in the RAM 130a. As compared to the storage device 100 in FIG. 1, a temperature sensor TS may be provided at the respective storage clusters 111a to 117a of the storage device 100a.

The storage clusters 111a to 117a may be divided into first to third cluster zones Z1 to Z3. In exemplary embodiments, the first to third cluster zones Z1 to Z3 may be determined according to a physical position on the PCB 140a. For example, the first to third cluster zones Z1 to Z3 may be decided according to a distance from the controller 120a on the PCB 140a. For example, as shown in FIG. 3, the first and second storage clusters 111a and 112a closest to the controller 120 may form the first cluster zone Z1, the third storage clusters 113a and a fourth storage cluster 114a may form the second cluster zone Z2, and the fifth to seventh storage clusters 115a to 117a that are farthest from the controller 120 may form a third cluster zone Z3. As another example, the storage clusters located on the top row in FIG. 3 may be determined as a first cluster zone, the storage clusters located on the middle row may be determined as a second cluster zone, and the storage clusters located on the bottom row may be determined as a third cluster zone. In some exemplary embodiments, the cluster zones may be dynamically determined by the controller 120a. Moreover, although the cluster zones in FIG. 3 are shown as containing two or three storage clusters, this is only an example, and the number of storage clusters in a cluster zone is not particularly limited. For example, a cluster zone may include only one cluster in some exemplary embodiments. As another example, a cluster zone may include more than three storage clusters. In some exemplary embodiments, each storage cluster may form its own cluster zone, in which case the controller 120a controls each storage cluster individually.

In exemplary embodiments, each of the storage clusters 111a to 117a consumes power when performing a write, read or erase operation. That is, each of the storage clusters 111a to 117a functions as a heat source when performing a write, read or erase operation. Each of the storage clusters 111a to 117a may be cooled down when not performing a write, read or erase operation.

On the other hand, the controller 120a consumes power when accessing one of the storage clusters 111a to 117a, when accessing the RAM 130a, when communicating with an external host device, and when internally carrying out an operation. That is, an interval in which the controller 120a functions as a heat source may be longer than that in which each of the storage clusters 111a to 117a functions as a heat source. Thus, the controller 120a may be a main heat source of the storage device 100a.

Distances between the controller 120a and the first and second storage clusters 111a and 112a belonging to the first cluster zone Z1 are similar to each other. Thus, the first and second storage clusters 111a and 112a may receive a similar first amount of heat from the controller 120a.

Distances between the controller 120a and the third and fourth storage clusters 113a and 114a belonging to the second cluster zone Z2 are similar to each other. Thus, the third and fourth storage clusters 113a and 114a may receive a similar second amount of heat from the controller 120a. A distance between the controller 120a and the second cluster zone Z2 is longer than that between the controller 120a and the first cluster zone Z1. Thus, the second amount of heat may be smaller than the first amount of heat.

Distances between the controller 120a and the fifth to seventh storage clusters 115a to 117a belonging to the third cluster zone Z3 are similar to each other. Thus, the fifth to seventh storage clusters 115a to 117a may receive a similar third amount of heat from the controller 120a. A distance between the controller 120a and the third cluster zone Z3 is longer than that between the controller 120a and the second cluster zone Z2. Thus, the third amount of heat may be smaller than the second amount of heat.

As described above, storage clusters having a similar thermal property may be managed as a single cluster zone based on the amount of heat in the storage device 110a or the amount of heat transferred to the storage clusters 111a to 117a by the environment to which the storage device 100a belongs. Although a distance with the controller 120a has been mentioned as an example of the thermal property, it is merely exemplary for better understanding and does not limit the inventive concept. As another example, in a case in which the storage clusters in the top row of FIG. 3 are treated as a cluster zone, the storage clusters of this cluster zone may be located close to an external component that produces a large amount of heat such that the amount of heat of the storage clusters in the top row is similar.

The controller 120a may obtain temperature information from the temperature sensor TS of each of the storage clusters 111a to 117a. For example, the controller 120a may transmit a command requesting the temperature information to each of the storage clusters 111a to 117a. Each of the storage clusters 111a to 117a may transmit the temperature information to the controller 120a in response to the transmitted command. Alternatively, the controller 120a may communicate with the temperature sensors TS not through a normal channel but through a sideband channel of the storage clusters 111a to 117a. For example, the controller 120a may communicate with the temperature sensors TS through a sideband channel such as an inter-integrated circuit (I2C).

In exemplary embodiments, the controller 120a may calculate a temperature of a single cluster zone from temperature information detected from storage clusters belonging to the cluster zone. For example, the controller 120a may decide an average, a weighted average, an arithmetic average, a geometric average or the like of the storage clusters belonging to the cluster zone as the temperature of the cluster zone. Alternatively, the controller 120a may decide one of the temperatures detected from storage clusters belonging to a single cluster zone as temperature of the cluster zone. For example, the controller 120a may decide a lowest temperature, a highest temperature, an intermediate temperature or the like among the temperatures of the storage clusters belonging to the cluster zone as the temperature of the cluster zone.

As shown in FIG. 3, a temperature sensor TS is provided at each of the storage clusters 111a to 117a. However, a position of the temperature sensor TS is not limited thereto. For example, the temperature sensor TS may be omitted from the storage clusters 111a to 117a and may be provided on the PCB 140a. In some exemplary embodiments, a temperature sensor may be provided on the PCB 140a in addition to the temperature sensors TS provided at each of the storage clusters 11a to 117a shown in FIG. 3.

FIG. 4 is a table illustrating an example of slow schemes by which a controller 120a controls a slow storage cluster. Referring to FIGS. 3 and 4, the controller 120a may apply at least one of first to third schemes S1 to S3 to the slow storage cluster.

According to the first scheme S1, the controller 120a may decrease a frequency of storage clusters belonging to a slow cluster zone. For example, the controller 120a may increase a delay of the storage clusters belonging to the slow cluster zone, e.g., a time interval to transmit a request, etc., to reduce an operation frequency of the storage clusters belonging to the slow cluster zone. Thus, a temperature of the slow cluster zone may be reduced.

According to the second scheme S2, the controller 120a may migrate hot data stored in the storage clusters in the slow cluster zone to storage clusters in a normal cluster zone. For example, when the number of accesses to (reading and updating) a specific logical address LBA is greater than or equal to a threshold value, data stored in the logical address LBA may be determined to be hot data. The hot data may cause a frequency of access to a storage cluster and a temperature of the storage cluster to increase. Accordingly, the temperature of the slow cluster zone may be reduced by migrating hot data stored in the storage cluster in the slow cluster zone to a storage cluster in a normal cluster zone. For example, the controller 120a may remap (or replace) logical addresses LBA of a migrated source storage cluster and logical addresses LBA of a target storage cluster.

According to the third scheme S3, the controller 120a may remap (or replace) a logical address LBA of a write request corresponding to a storage cluster in the slow cluster zone with a logical address LBA of a storage cluster in a normal cluster zone. That is, a write request for the storage cluster in the slow cluster zone is remapped (or replaced) with a write request for the storage cluster in the normal cluster zone. The third scheme will be described in further detail later with reference to FIGS. 5 to 7.

In exemplary embodiments, one of the first to third schemes S1 to S3 or a combination of at least two of the first to third schemes S1 to S3 may be applied to the storage clusters in the slow cluster zone.

In exemplary embodiments, the first to third schemes S1 to S3 may be applied step by step according to the temperature of the slow cluster zone. For example, when the temperature of the slow cluster zone is greater than or equal to a first threshold value and smaller than a second threshold value, one of the first to third schemes S1 to S3 may be applied. When the temperature of the slow cluster is greater than or equal to the second threshold value and smaller than a third threshold value, another scheme may be applied instead of a previously applied one of the first to third schemes S1 to S3, or alternatively not only a previously applied scheme but also another scheme may be additionally applied.

The first to third schemes S1 to S3 may be variously applied and are not limited to the above description.

Moreover, various types of schemes may be applied to the slow cluster zone, and the schemes are not limited to the first to third schemes S1 to S3 shown in FIG. 4.

FIGS. 5 to 7 illustrate the procedure of executing the third scheme S3 illustrated in FIG. 4. Referring to FIGS. 3 and 5, among the second mapping table MT2 managed by the controller 120a and the first mapping tables MT1 managed by the storage clusters 111a to 117a, the first mapping tables MT1 of second and seventh storage clusters 112a and 117a are shown in FIG. 5.

Referring to the second mapping table MT2, first to third cluster zones Z1 to Z3, first to seventh clusters 111a to 117a corresponding to the first to third cluster zones Z1 to Z3, and a logical address LBA corresponding to the first to seventh storage clusters 111a to 117a are shown.

The first cluster zone Z1 includes the first and second storage clusters 111a and 112a. Logical addresses LBA of '0' to '999' are assigned to the first storage cluster 111a, and logical addresses LBA of '1000' to '1999' are assigned to the second storage cluster 112a. When an external host device requests an access to a logical address between '0' and '999', the controller 120a may transmit the request to the first storage cluster 111a according to the second mapping table MT2. When the external host device requests an access to a logical address LBA between '1000' and '1999', the controller 120a may transmit the request to the second storage cluster 112a according to the second mapping table MT2.

The second cluster zone Z2 includes the third and fourth clusters 113a and 114a. Logical addresses LBA of '2000' and '2999' are assigned to the third storage cluster 113a. Logical addresses LBA of '3000' to '3999' are assigned to the fourth storage cluster 114a. When the external host device requests an access to the logical address between '2000' to '2999', the controller 120a may transmit the request to the third storage cluster 113a according to the second mapping table MT2. When the external host device requests an access to the logical address between '3000' to '3999', the controller 120a may transmit the request to the fourth storage cluster 114a according to the second mapping table MT2.

The third cluster zone Z3 includes the fifth to seventh storage clusters 115a to 117a. Logical addresses LBA of '4000' and '4999' are assigned to the fifth storage cluster 115a. Logical addresses LBA of '5000' to '5999' are assigned to the sixth storage cluster 116a. Logical addresses LBA of '6000' to '6999' are assigned to the seventh storage cluster 117a. When the external host device requests an access to the logical address between '4000' to '4999', the controller 120a may transmit the request to the fifth storage cluster 115a according to the second mapping table MT2. When the external host device requests an access to the logical address between '5000' to '5999', the controller 120a may transmit the request to the sixth storage cluster 116a according to the second mapping table MT2. When the external host device requests an access to the logical address between '6000' to '6999', the controller 120a may transmit the request to the seventh storage cluster 117a according to the second mapping table MT2.

Referring to the first mapping table MT1 of the second storage cluster 112a, a mapping relationship between the logical addresses LBA assigned to the second storage cluster 112a and physical addresses PBA of a storage space of the second storage cluster 112a is shown. Logical addresses LBA of '1000' to '1199' are mapped to physical addresses PBA of '0' to '199'. Logical addresses LBA of '1200' to '1399' are mapped to physical addresses PBA of '200' to '399'. Logical addresses LBA of '1400' to '1599' are mapped to physical addresses PBA of '400' to '599'. Logical addresses LBA of '1600' to '1799' are mapped to physical addresses PBA of '460' to '799'. Logical addresses LBA of '1600' to '1799' are mapped to physical addresses PBA of '600' to '799'. Logical addresses LBA of '1800' to '1999' are mapped to physical addresses PBA of '800' to '999'.

A valid mark indicates whether valid data is stored in a storage space of a physical address PBA of the second storage cluster 112a. For example, in FIG. 5, valid data is stored in a storage space that the physical addresses PBA of '0' to '599' indicate, and thus a valid mark V is indicated. On the other hand, valid data is not stored in the physical addresses PBA of '600' to '999', and an invalid mark I is indicated.

In exemplary embodiments, a mapping relationship between logical addresses LBA and physical addresses PBA may vary depending on the control of the second storage cluster 112a. For example, update of data written into the logical addresses LBA of '1200' to '1399' may be requested. For example, a write operation on the logical addresses LBA of '1200' to '1399' may be requested. At this point, the second storage cluster 112a may remove a mapping relationship between the logical addresses LBA of '1200' to '1399' and the physical addresses PBA of '200' to '399' and indicate an invalid mark I on the '200' to '399'. The second storage cluster 112a may map physical addresses into which data is not written, e.g., physical addresses PBA of '600' to '799' to the logical addresses LBA of '1200' to '1399'. The second storage cluster 112a may write data into the physical addresses PBA of '600' to '799' according to a write request for the logical addresses LBA of '1200' to '1399'.

Referring to the first mapping table MT1 of the seventh storage cluster 117a, a mapping relationship between logical addresses LBA assigned to the seventh cluster 117a and physical addresses PBA of a storage space of the seventh storage cluster 117a is shown. The logical addresses LBA of '6000' to '6199' are mapped to the physical addresses PBA of '0' to '199'. The logical addresses LBA of '6200' to '6399' are mapped to the physical addresses PBA of '200' to '399'. The logical addresses LBA of '6400' to '6599' are mapped to the physical addresses PBA of '400' to '599'. The logical addresses LBA of '6600' to '6799' are mapped to the physical addresses PBA of '600' to '799'. The logical addresses LBA of '6800' to '6999' are mapped to the physical addresses PBA of '800' to '999'.

In the first mapping table MT1 of the seventh storage cluster 117A, a valid mark V is indicated on the physical addresses PBA of '0' to '199', and an invalid mark I is indicated on the physical addresses PBA of '200' to '999'.

The controller 120a may perform thermal leveling on the first to third cluster zones Z1 to Z3. For example, the first cluster zone Z1 may be a slow cluster zone. The second and third cluster zones Z2 and Z3 may be normal cluster zones. In other words, in this example, the second storage cluster 112a is located in the first cluster zone Z1 which is a slow cluster zone, and the seventh storage cluster 117a is located in the third cluster zone Z3 which is a normal cluster zone.

A write request for the logical addresses of '1600' to '1799' corresponding to a slow cluster zone may be received from an external host device. According to the third scheme S3 in FIG. 4, the controller 120a may remap (or replace) logical addresses LBA of a write-requested slow cluster with logical addresses of a normal cluster zone.

Referring to FIGS. 3 and 6, logical addresses LBA of '1600' to '1799' of the second storage cluster 112a corresponding to a write request are remapped (or replaced) with logical addresses LBA on which an invalid mark I is indicated or into which data is not written among storage clusters in a normal cluster zone. For example, comparing FIGS. 5 and 6, the logical addresses LBA of '1600' to '1799' of the second storage cluster 112a may be remapped (or replaced) with the logical addresses LBA of '6200' to '6399' of the seventh storage cluster 117a. Thus, the second storage cluster 112a may remapped (or replaced) to correspond to the logical addresses LBA of '1000' to '1599', '1800' to '1999', and '6200' to '6399'. The seventh storage cluster 117a may be remapped (or replaced) to correspond to the logical addresses LBA of '1600' to '1799', '6000' to '6199', and '6400' to '6999'.

A result of the remapping (or replacement) may be transmitted to the second and seventh storage clusters 112a and 117a associated with the remapping (or replacement). According to the result of the remapping (or replacement), the second storage cluster 112a may map the physical addresses PBA of '600' to '799' to the logical addresses LBA of '6200' to '6399'. The seventh storage cluster 117a may map the physical address PBA of '200' to '399' to the logical addresses LBA of '1600' to '1799'.

The controller 120a may transmit a write request corresponding to the logical addresses LBA of '1600' to '1799' received from the external host device to the seventh storage cluster 117a according to the second mapping table MT2. The seventh storage cluster 117a may write data into the physical addresses PBA of '200' to '399' according to the first mapping table MT1. Then the seventh storage cluster 117a may indicate a valid mark V on the physical addresses PBA of '200' to '399'.

Then a write request, e.g., an update request corresponding to the logical addresses LBA of '1400' to '1599' may be received to the controller 120a from the external host device. Since the write request corresponds to a slow cluster zone, the controller 120a may remap (or replace) the logical addresses LBA of '1400' to '1599' corresponding to the write request with logical addresses LBA of the normal cluster zone. This will be described with reference to FIG. 7.

Referring to FIGS. 3 and 7, the logical addresses LBA of '1400' to '1599' of the second storage cluster 112a corresponding to the write request may be remapped (or replaced) with logical addresses LBA on which an invalid mark I is indicated or into which data is not written among the storage clusters in the normal cluster zone. For example, the logical addresses LBA of '1400' to '1599' of the second storage cluster 112a may be remapped (or replaced) with the logical addresses LBA of '6400' to '6599' of the seventh storage cluster 117a. Thus, comparing FIGS. 6 and 7, the second storage cluster 112a is remapped (or replaced) to correspond to the logical addresses LBA of '1000' to '1399', '1800' to '1999', and '6200' to '6599'. The seventh storage cluster 117a is remapped (or replaced) to correspond to the logical addresses LBA of '1400' to '1799', '6000' to '6199', and '6600' to '6999'.

A result of the remapping (or replacement) may be transmitted to the second and seventh storage clusters 112a and 117a associated with the remapping (or replacement). According to the result of the remapping (or replacement), the second storage cluster 112a may map the physical addresses PBA of '400' to '599' to the logical addresses LBA of '6400' to '6599'. The second storage cluster 112a may indicate an invalid mark I on the physical addresses PBA of '400' to '599'. The seventh storage cluster 117a may map the physical addresses PBA of '400' to '599' to the logical addresses LBA of '1400' to '1599'.

The controller 120a may transmit a write request corresponding to the logical addresses LBA of '1400' to '1599' received from the external host device to the seventh storage cluster 117a according to the second mapping table MT2. The seventh storage cluster 117a may write data into the physical addresses PBA of '400' to '599' according to the first mapping table MT1. Then the seventh storage cluster 117a may indicate a valid mark V on the physical addresses PBA of '400' to '599'.

In exemplary embodiments, the procedure described with reference to FIGS. 6 and 7 may also be applied to the second scheme S2 in FIG. 4. For example, in FIG. 6, data corresponding to the logical addresses LBA of '1400' to '1599' may be determined to be hot data. The hot data may migrate to a normal storage cluster, as described with reference to FIG. 7. In a source storage cluster and a target storage cluster of the migration, logical addresses LBA corresponding to the hot data may be remapped (or replaced) with each other.

Figure 8:
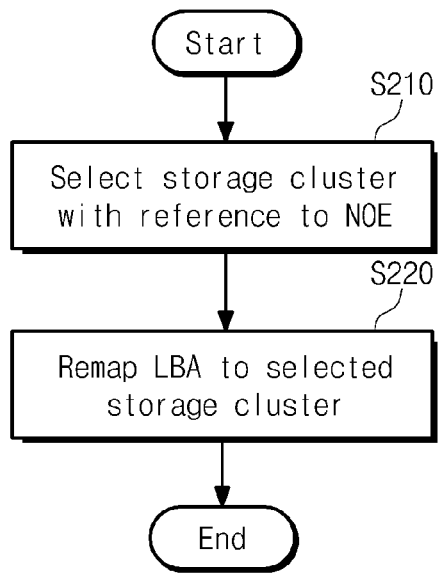
FIG. 8 is a flowchart summarizing a method of selecting a storage cluster to which logical addresses are to be remapped among storage clusters in normal cluster zones according to the third scheme, by a controller.

FIG. 8 is a flowchart summarizing a method of selecting a storage cluster to which logical addresses are to be remapped among storage clusters in normal cluster zones according to a third scheme S3 by the controller 120. Referring to FIGS. 3 and 8, the controller 120a may select a storage cluster where logical addresses LBA are to be remapped (or replaced) with reference to the number of erases (NOE) (also denoted the wear level) of storage clusters in a normal cluster zone (S210). For example, a storage cluster having the smallest NOE (i.e., a lowest wear level) may be selected.

The controller 120a may remap (or replace) logical address LBA of a storage cluster in a slow cluster zone corresponding to a write request with logical addresses LBA of the selected storage cluster (S220).

As described above, the controller 120a may refer to wear leveling when performing thermal leveling. Similarly, the controller 120a may refer to thermal leveling when performing wear leveling. For example, when migrating data of a storage cluster having a large NOE (i.e., a high wear level) to another storage cluster, the controller 120a may select a storage cluster where migration is to be performed among storage clusters belonging to not the slow cluster zone but the normal cluster zone.

When migrating data, the controller 120a may remap (or replace) logical addresses LBA. For example, the controller 120a may remap (or replace) logical addresses LBA of a source storage cluster in which data is stored and logical addresses LBA of a target storage cluster to which data is to migrate.

Figure 9:
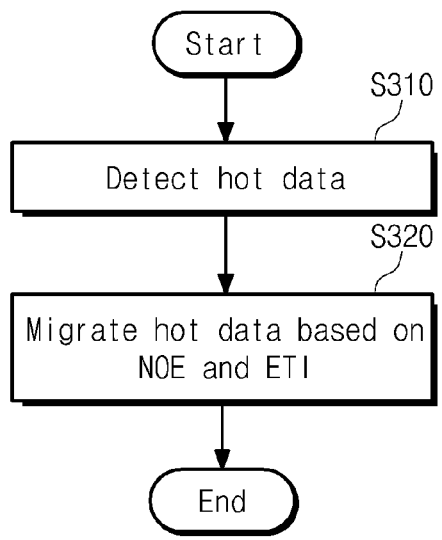
FIG. 9 is a flowchart summarizing a method of managing hot data by a controller.

FIG. 9 is a flowchart summarizing a method of managing hot data by the controller 120a. Referring to FIGS. 3 and 9, the controller 120a may detect hot data (S310). For example, when the number of accesses to a specific logical address LBA is greater than or equal to a threshold value, data stored in the logical address LBA may be determined to be hot data.

The controller 120a may migrate the hot data based on the number of erases (NOE) (i.e., the wear level) and estimated temperature information (ETI) (S320). For example, the controller 120a may migrate the hot data to a storage cluster having a smaller NOE (i.e., a lower wear level) and a storage cluster in a cluster zone having a lower ETI.

In exemplary embodiments, the ETI includes information on an estimated temperature of a cluster zone. For example, the ETI of the cluster zone may increase as a distance from the controller 120 decreases, as described with reference to FIG. 3. The ETI of the cluster zone may decrease as the distance from the controller 120 increases.

When migrating the hot data, the controller 120a may remap (or replace) logical addresses LBA. For example, the controller 120a may remap (or replace) logical addresses LBA of a source storage cluster in which the hot data is stored and logical addresses LBA of a target storage cluster to which the hot data is to migrate.

Figure 10:
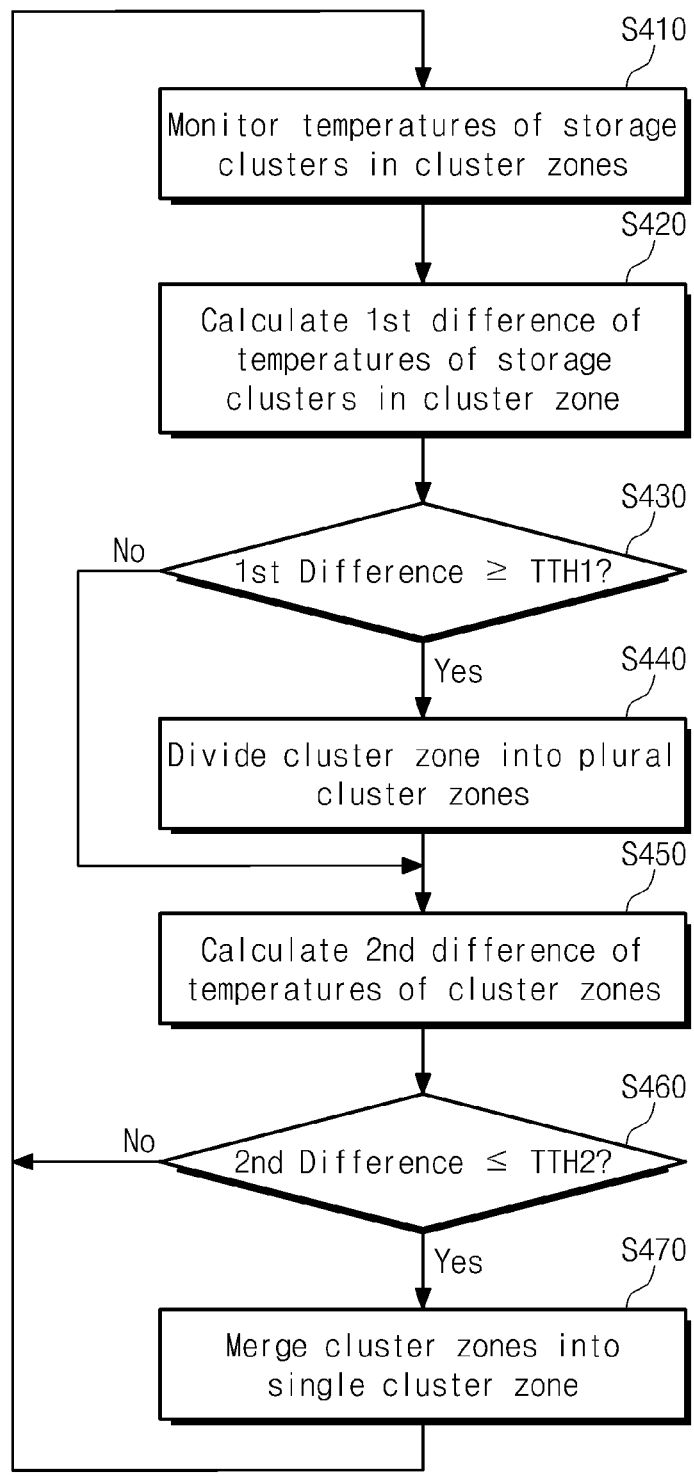
FIG. 10 is a flowchart summarizing a method of adjusting cluster zones according to exemplary embodiments.

FIG. 10 is a flowchart summarizing a method of adjusting cluster zones according to exemplary embodiments. Referring to FIGS. 3 and 10, the controller 120a may monitor temperatures of the storage clusters 111a to 117a in the cluster zones Z1 to Z3 (S410).

The controller 120a may calculate a first difference between temperatures of storage clusters in each cluster zone (S420). In other words, for each cluster zone, the controller 120a may calculate first differences between the temperatures of the storage clusters in the cluster zone.

When the calculated first difference is greater than or equal to a first threshold value TTH1 (S430), the controller 120a may divide a corresponding cluster zone into a plurality of cluster zones (S440). For example, when a difference between temperatures of the first and second storage clusters 111a and 112b in the first cluster zone Z1 is greater than or equal to the first threshold value TTH1, the first and second storage clusters 111a and 112b may be divided into different cluster zones. For example, when a difference between temperatures of the fifth and sixth storage clusters 115a and 116a, and a temperature of the seventh storage cluster 117a in the third cluster zone Z3 is greater than or equal to the first threshold value TTH1, the fifth and sixth storage clusters 115a and 116a may form a single cluster zone and the seventh cluster 117a may form another single cluster zone.

The controller 120a may calculate a second difference between temperatures of cluster zones (S450). For example, the controller 120a may calculate a second difference between a temperature of a first cluster zone and a temperature of a second cluster zone. As discussed above, the temperature of the cluster zone may be an average of the temperatures of the storage clusters in the cluster zone.

When the calculated second difference is less than or equal to a second threshold value TTH2 (S460), the controller 120a may merge corresponding cluster zones into a single cluster zone (S470). For example, when a difference between temperatures of the second cluster zone Z2 and the third cluster zone Z3 is less than or equal to the second threshold value TTH2, the controller 120a may merge the second and third cluster zones Z2 and Z3 into a single cluster zone.

In exemplary embodiments, initial cluster zones of storage clusters may be set according to an internal environment of the storage device 100, e.g., a distance from the controller 120a. Then the controller 120a may adjust the cluster zones according to the external environment.

For example, when a cooling device such as a fan is disposed in the vicinity of the storage device 100, a temperature surrounding the cooling device may be made lower than a temperature of another position. On the other hand, when the fan disposed in the vicinity of the storage device 100 is broken, a temperature surrounding the broken fan may be higher than temperature of another position.

Temperature characteristics of storage clusters may vary depending on a pattern of accessing the storage device 100 by the external host device. For example, when a frequency of accessing specific logical addresses LBA by the external host device is higher than a frequency of accessing other logical addresses, a temperature of a storage cluster belonging to a specific logical address LBA may be higher that of other storage clusters.

The controller 120a may assign estimated temperature information reflecting external and internal environments to each of the storage clusters 111a to 117a. For example, estimated temperature information of each storage cluster may decrease as a distance from the controller 120a increases. For example, the estimated temperature information of each storage cluster may increase as mean temperature (or accumulated mean temperature) increases. The estimated temperature information of each storage cluster may decrease as mean temperature (or accumulated mean temperature) decreases. For example, the estimated temperature information of each storage cluster may increase as power consumption (or accumulated mean power consumption) increases. The estimated temperature information of each storage cluster may decrease as the power consumption (or accumulated mean power consumption) decreases. For example, the estimated temperature information of each storage cluster may increase as an access frequency (or accumulated mean access frequency) increases. The estimated temperature information of each storage cluster may decrease as the access frequency (or accumulated mean access frequency) decreases.

The controller 120a may divide the range of estimated temperature information into sections and set cluster zones depending on which section the estimated temperature information of each storage cluster belongs to. For example, the controller 120a may set storage clusters belonging to a single section to a single cluster zone and set storage clusters belonging to another section to other cluster zones. Alternatively, the controller 120a may set cluster zones according to a difference between estimated temperature information. For example, storage clusters having estimated temperature information with a difference less than a threshold value may be included in a single cluster zone. Storage clusters having estimated temperature information with a difference greater than the threshold value may be included in separate cluster zones.

A method of adjusting cluster zones by the controller 120a is not limited to the above-described exemplary embodiments and may be variously modified and changed.

Figure 11:
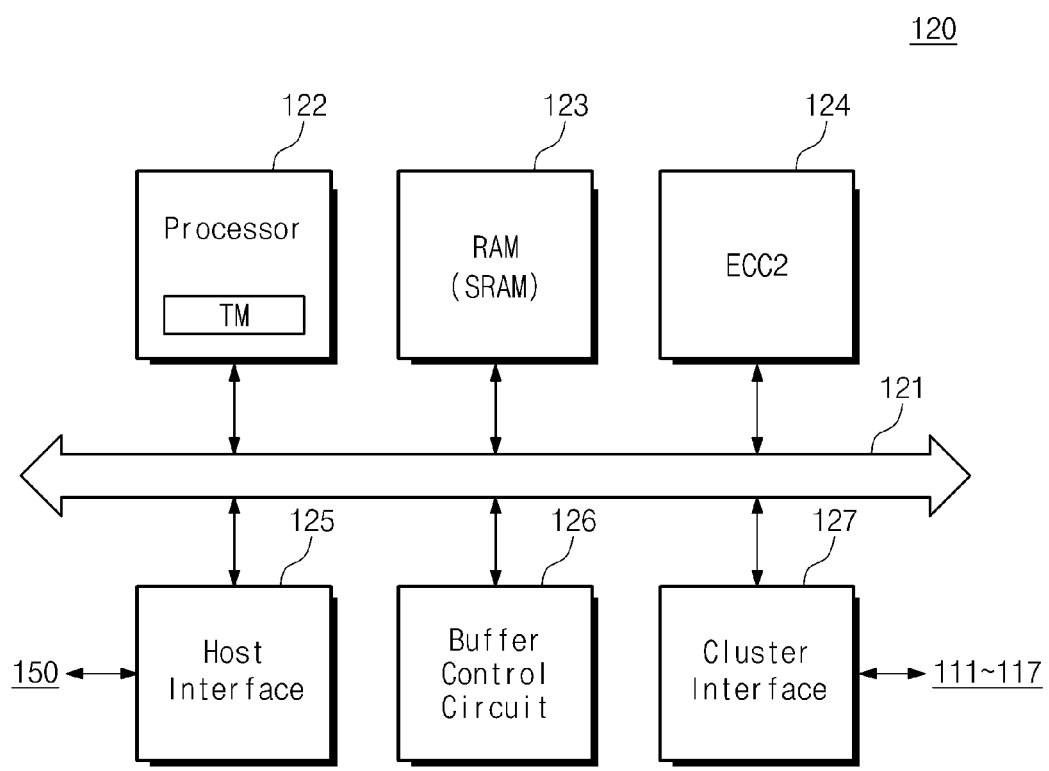
FIG. 11 is a block diagram of a controller according to exemplary embodiments.

FIG. 11 is a block diagram of the controller 120 according to exemplary embodiments. The controller 120a of FIG. 3 may have a similar configuration as the controller 120. Referring to FIGS. 1 and 11, the controller 120 includes a bus 121, a processor 122, a RAM 123, a second error correction code block (ECC2) 124, a host interface 125, a buffer control circuit 126, and a cluster interface 127.

The bus 121 is configured to provide a channel between components of the controller 120.

The processor 122 may control the overall operation of the controller 120 and perform a logical operation. The processor 122 may communicate with the external host device through the host interface 125, communicate with the storage clusters 111 to 117 through the cluster interface 127, and communicate with the RAM 130 through the buffer control circuit 126. The processor 122 may be used as a working memory, a cache memory or a buffer memory to control the storage device 100. The processor 122 may include a temperature manager TM. The temperature manager TM may be provided in the form of software executed by the processor 122, hardware provided as a part of the processor 122, or a combination of software and hardware.

The RAM 123 may be used as a working memory, a cache memory or a buffer memory of the processor 122. The RAM 123 may store codes and commands executed by the processor 122. The RAM 123 may store data processed by the processor 122. The RAM 123 may include a static RAM (SRAM).

The second ECC 124 may perform error correction. The second ECC 124 may perform an error correction encoding operation based on data to be written into the storage clusters 111 to 117 through the cluster interface 127. Error correction encoded data may be transmitted to the storage clusters 111 to 117 through the cluster interface 127. The second EEC 124 may perform an error correction decoding operation on the data received from the storage clusters 111 to 117 through the cluster interface 127. In exemplary embodiments, the second ECC 124 may be included in the memory interface 127 as a component of the memory interface 127.

The host interface 125 is connected to the connector 150. The host interface 125 may be configured to perform communication based on at least one of various communication protocols such as USB (Universal Serial Bus), SATA (Serial AT Attachment), SAS (Serial Attached SCSI), HSIC (High Speed Interchip), SCSI (Small Computer System Interface), PCI (Peripheral Component Interconnection), PCIe (PCI express), NVMe (NonVolatile Memory express), UFS (Universal Flash Storage), SD (Secure Digital), MMC (MultiMedia Card), eMMC (embedded MMC), DIMM (Dual In-line Memory Module), RDIMM (Registered DIMM), and LRDIMM (Load Reduced DIMM).

The buffer control circuit 126 is configured to control the RAM 130 according to the control of the processor 122.

The cluster interface 127 is configured to communicate with the storage clusters 111 to 117 according to the control of the processor 122. As described with reference to FIG. 1, the cluster interface 127 may communicate a command, an address, and data with the storage clusters 111 to 117 through an input/output channel. The cluster interface 127 may communicate a control signal with the storage clusters 111 to 117 through a control channel.

In some exemplary embodiments, the RAM 130 may be omitted from the storage device 110. In this case, the buffer control circuit 126 may be omitted from the memory controller 120.

In exemplary embodiments, the processor 122 may control the controller 120 using codes. The processor 122 may load codes from the nonvolatile memory (e.g., ROM) provided in the memory controller 120. In exemplary embodiments, the processor 122 may load codes received from the storage clusters 111 to 117 through the cluster interface 127.

In exemplary embodiments, the bus 121 of the memory controller 120 may be classified into a control bus and a data bus. The data bus may be configured to transmit data in the memory controller 120, and the control bus may be configured to transmit control information such as a command and an address in the memory controller 120. The data bus and the control bus may be separated from each other and may not interfere with each other or may not have an influence on each other. The data bus may be connected to the host interface 125, the buffer control circuit 126, the ECC 124, and the cluster interface 127. The control bus may be connected to the host interface 125, the processor 122, the buffer control circuit 126, the RAM 123, and the cluster interface 127.

Figure 12:
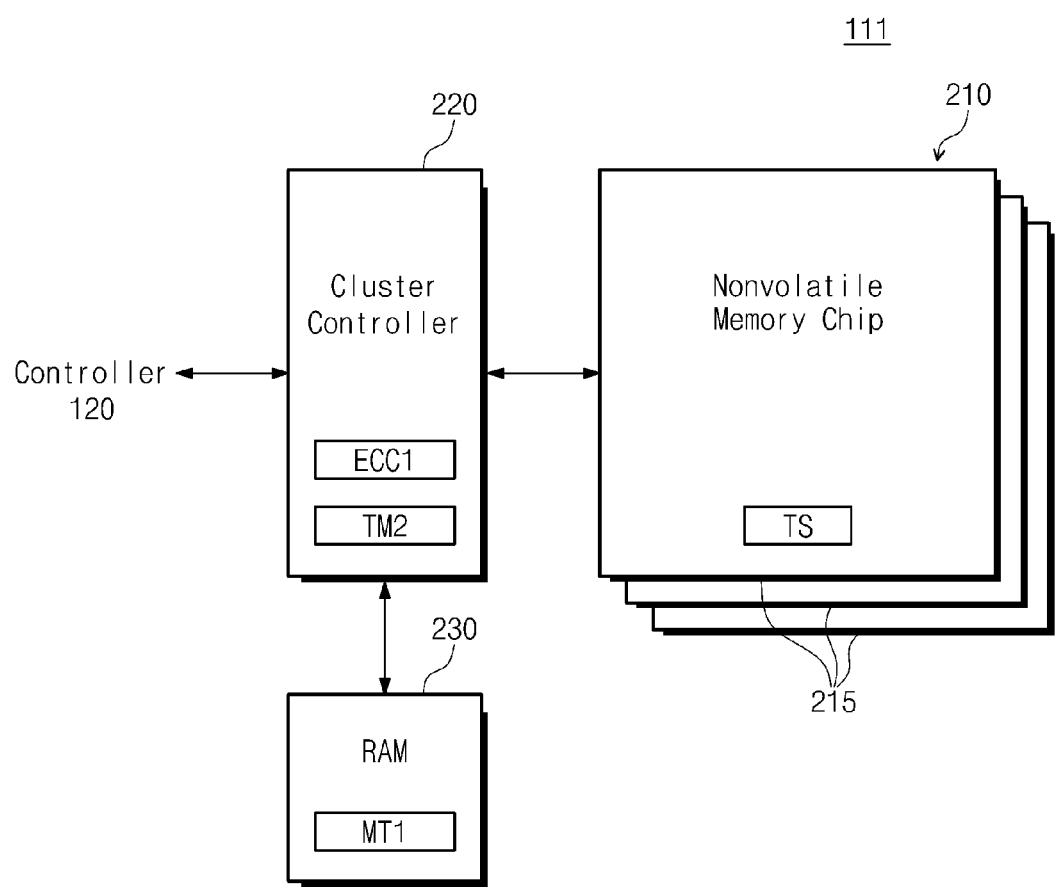
FIG. 12 is a block diagram of a storage cluster according to exemplary embodiments.

FIG. 12 is a block diagram of a storage cluster 111 according to exemplary embodiments s. Among the storage clusters 111 to 117 in FIG. 1, the first storage cluster 111 is shown in FIG. 12. The storage clusters 111 to 117 may have the same structure and operate in the same manner. The storage clusters 111a to 117a may have the same structure and operate in the same manner.

Referring to FIGS. 1 and 12, the storage cluster 111 may include a nonvolatile memory device 210, a cluster controller 220, and a RAM 230. The nonvolatile memory device 210 may perform write, read, and erase operations according to the control of the cluster controller 220. The nonvolatile memory device 210 may receive a command and an address from the cluster controller 220 through an input/output channel. The nonvolatile memory device 210 may exchange data with the cluster controller 220 through the input/output channel.

The nonvolatile memory device 210 may exchange a control signal with the cluster controller 220 through a control channel. For example, the nonvolatile memory device 210 may receive, from the cluster controller 220, at least one of a chip enable signal /CE to select at least one of semiconductor chips of the nonvolatile memory device 210, a command latch enable signal CLE to indicate that a signal received from the cluster controller 220 is a command, an address latch enable signal ALE to indicate that a signal received from the cluster controller 220 is an address, a read enable signal /RE generated by the cluster controller 220 during a read operation and periodically toggled to be used to set timings, a write enable signal /WE enabled by the cluster controller 220 when the command or the address is transmitted, a write protection signal /WP enabled by the cluster controller 220 to limit (and/or prevent) an unintentional write or erase operation when power changes, and a data strobe signal DQS generated by the cluster controller 220 during a write operation and periodically toggled to be used to set input synchronization of the data transmitted through the input/output channel. For example, the nonvolatile memory device 210 may output, to the cluster controller 220, at least one of a ready/busy signal R/nB to indicate that the nonvolatile memory device 210 is performing a program, erase or read operation and a data strobe signal DQS generated from the read enable signal /RE by the nonvolatile memory device 210 and toggled to be used to set output synchronization of the data.

The nonvolatile memory device 210 may include a flash memory. However, the nonvolatile memory device 210 is not limited to inclusion of the flash memory. The nonvolatile memory device 210 may include at least one of various nonvolatile memory devices such as a phase-change RAM (PRAM), a magnetic RAM (MRAM), a resistive RAM (RRAM), and a ferroelectric RAM (FeRAM).

The nonvolatile memory 210 may include a temperature sensor TS. For example, at least one of a plurality of nonvolatile memory chips 215 of the nonvolatile memory device 210, or each of the nonvolatile memory chips 215 may include a temperature sensor TS.

The cluster controller 220 is configured to control the nonvolatile memory 210. For example, the cluster controller 220 may control the nonvolatile memory device 210 through the input/output channel and the control channel such that the nonvolatile memory device 210 performs a write, read or erase operation.

The cluster controller 220 may control the nonvolatile memory device 210 according to the control of the controller 120. The cluster controller 220 may obtain temperature information from the temperature sensor TS according to a request of the controller 120. The cluster controller 220 may output the obtained temperature information TS to the controller 120 through the input/output channel.

The cluster controller 220 may use the RAM 230 as a buffer memory, a cache memory or a working memory. The cluster controller 220 may store data or code used to manage the nonvolatile memory device 210 in the RAM 230. For example, the cluster controller 220 may read the data or the code used to manage the nonvolatile memory device 210 from the nonvolatile memory device 210 and load the data or the code to the RAM 230 to drive the nonvolatile memory device 210. For example, the cluster controller 220 may be used by loading the first mapping table MT1 to the RAM 230.

The cluster controller 220 may include a first error correction code block ECC1. In addition, the cluster controller 220 may include a second temperature manager TM2. The cluster controller 220 may perform thermal leveling of the nonvolatile memory chips of the nonvolatile memory device 210 using the second temperature manager TM2. The method of performing thermal leveling by the second temperature manager TM2 will be described in detail later with reference to FIGS. 13 and 14.

The RAM 230 may include at least one of various random access memory devices such as a dynamic RAM (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM).

The nonvolatile memory device 210 may include a plurality of nonvolatile memory chips 215. In exemplary embodiments, the cluster controller 220 and the nonvolatile memory chips 215 may be connected to each other based on a channel and a way. A single channel may include a single data channel and a single control channel. The single channel may include eight data lines. The single control channel may include control lines to transmit the chip enable signal /CE, the command latch enable signal CLE, the address latch enable signal ALE, the read enable signal /RE, the write enable signal /WE, the write protection signal /WP, and the ready and busy signal R/nB.

Nonvolatile memory chips 215 connected to a single channel may form a way. If n nonvolatile memory chips 215 are connected to a single channel, an n-way may be formed. Nonvolatile memory chips 215 belonging to a single way may share data line and control lines to transmit the command latch enable signal CLE, the address latch enable signal ALE, the read enable signal /RE, the write enable signal /WE, and the write protection signal /WP. Each of the nonvolatile memory chips 215 belonging to the single way may communicate with the controller 120 through dedicated control lines to transmit the chip enable signal /CE and the ready and busy signal R/nB.

The cluster controller 220 may alternately access nonvolatile memory chips 215 of an n-way connected to a single channel. The cluster controller 220 may independently access nonvolatile memory chips 215 connected to different channels. The cluster controller 220 may alternately or simultaneously access nonvolatile memory chips 215 connected to different channels.

In exemplary embodiments, nonvolatile memory chips 215 may be connected to the cluster controller 220 in the form of a wide IO. For example, nonvolatile memory chips 215 connected to different channels may share a control line of a single chip enable signal /CE. The nonvolatile memory chips 215 sharing the control line of the single chip enable signal /CE may be accessed at the same time. Since data lines of different channels are used at the same time, broad input/output bandwidth may be achieved.

As shown in FIG. 12, the storage cluster 111 includes the RAM 230 disposed outside the cluster controller 220. However, this is only an example. Alternatively or additionally, the RAM 230 may be disposed in the cluster controller 220 and the cluster controller 220 may be configured to use the internal RAM as a buffer memory, a working memory or a cache memory.

The storage cluster 111 may include a normal storage area and a reserved storage area. The normal storage area may be used to store user data by an external host device. For example, a storage capacity of the normal storage area may be identified as total storage capacity of the storage cluster 111 by the external host. The storage cluster 111 may use the reserved area to support various operations of the storage cluster 111. For example, the storage cluster 111 may be used to replace bad blocks, to support an address mapping between the physical address PBA and the logical addresses LBA, to support an address remapping described above referring FIGS. 4 to 7, to support various background operations such as a garbage collection, read reclaim, etc. At least a portion of the reserved area may be maintained free.

Figure 13:
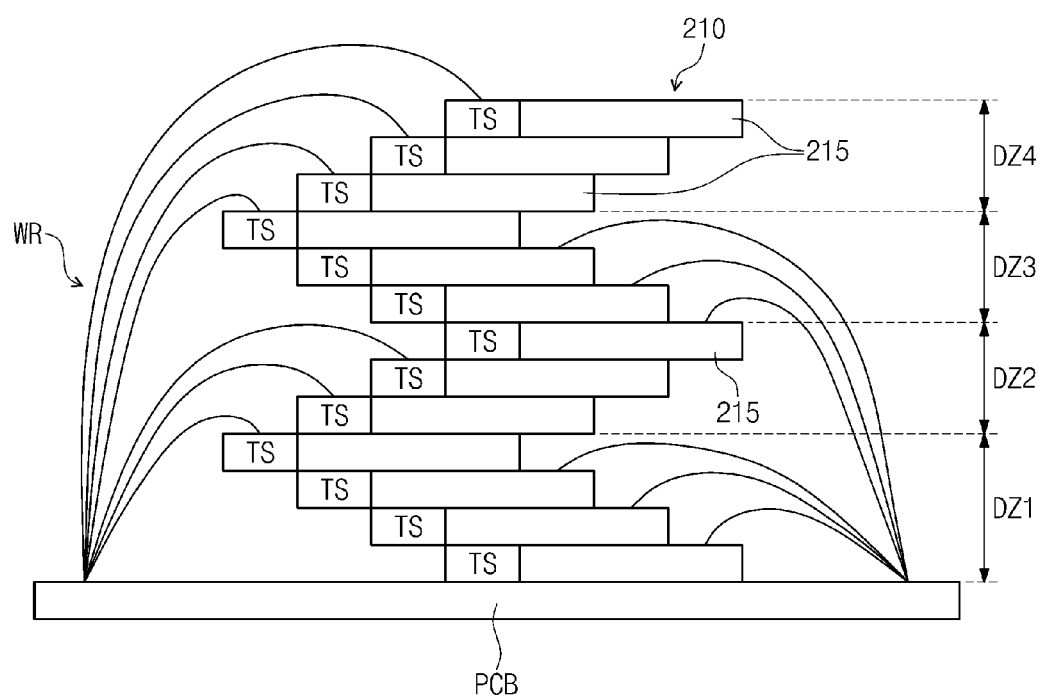
FIG. 13 illustrates an example of forming nonvolatile memory chips of a nonvolatile memory device.

FIG. 13 illustrates an example of forming nonvolatile memory chips 215 of the nonvolatile memory device 210. Referring to FIGS. 12 and 13, nonvolatile memory chips 215 may be stacked on a printed circuit board (PCB). In exemplary embodiments, the nonvolatile memory chips 215 may be stacked in cascade or stepwise. However, their stacked form is not limited thereto.

The nonvolatile memory chips 215 may be connected to the PCB through a wiring WR. In some exemplary embodiments, each of the nonvolatile memory chips 215 may include a temperature sensor TS.

For example, the cluster controller 220 may determine the mean, the weighted mean, the geometric mean or the like of temperature information obtained from the temperature sensors TS as temperature of the storage cluster 111. Alternatively, the cluster controller 220 may determine one of the temperatures determine from the temperature sensors TS as temperature of the storage cluster 111. For example, the cluster controller 220 may determine a lowest temperature, a highest temperature, an intermediary temperature or the like of the temperatures as the temperature of the storage cluster 111.

The cluster controller 220 may divide the nonvolatile memory chips 215 into vertical zones DZ1 to DZ4 according to a height from the PCB of each of the nonvolatile memory chips 215. The cluster controller 220 may perform thermal leveling on the vertical zones DZ1 to DZ4.

Figure 14:
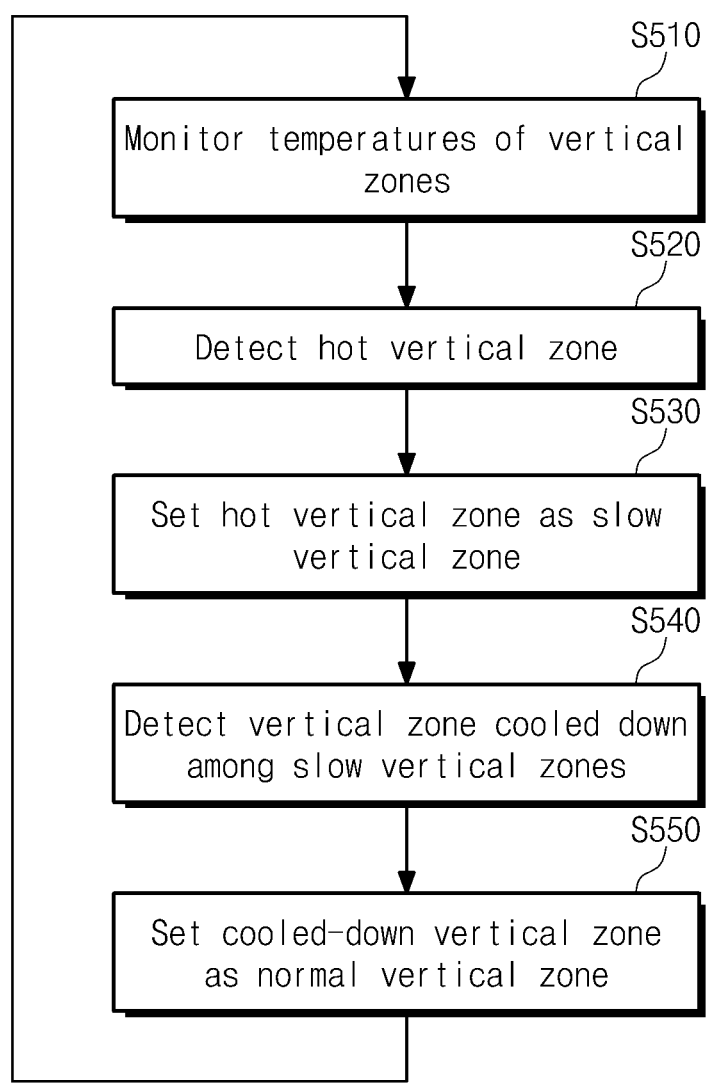
FIG. 14 is a flowchart summarizing a method of performing thermal leveling on vertical zones by a cluster controller.

FIG. 14 is a flowchart summarizing a method of performing thermal leveling on the vertical zones DZ1 to DZ4 by the cluster controller 220. Referring to FIGS. 13 and 14, the controller 120 may monitor temperatures of the vertical zones DZ1 to DZ4 (S510). For example, each vertical zone may include one or more nonvolatile memory chips 215. For example, the cluster controller 220 may decide the mean, the weighted mean, the arithmetic mean, the geometric mean or the like of temperature information of the nonvolatile memory chips 215 belonging to each vertical zone as a temperature of the vertical zone.

The cluster controller 220 detects a hot vertical zone among the vertical zones DZ1 to DZ4 (S520). For example, a vertical zone having temperature greater than or equal to a first threshold value may be detected as the hot vertical zone.

The cluster controller 220 sets the hot vertical zone as a slow vertical zone (S530). For example, the cluster controller 220 may limit the operation of nonvolatile memory chips 215 belonging to the slow vertical zone to reduce a temperature of the slow vertical zone. For example, the cluster controller 220 may migrate hot data in slow vertical zones to normal vertical zones according to a second scheme S2.

The cluster controller 220 may detect a cooled-down vertical zone among the slow vertical zones (S540). For example, when temperature of a slow vertical zone is less than or equal to a second threshold value, the cluster controller 220 may determine that the slow vertical zone is cooled down. For example, the second threshold value may be less than or equal to the first threshold value.

The cluster controller 220 may set the cooled-down vertical zone as a normal vertical zone (S550). For example, the limitation of the operation of nonvolatile memory chips belonging to the cooled-down vertical zone may be released.

Figure 15:
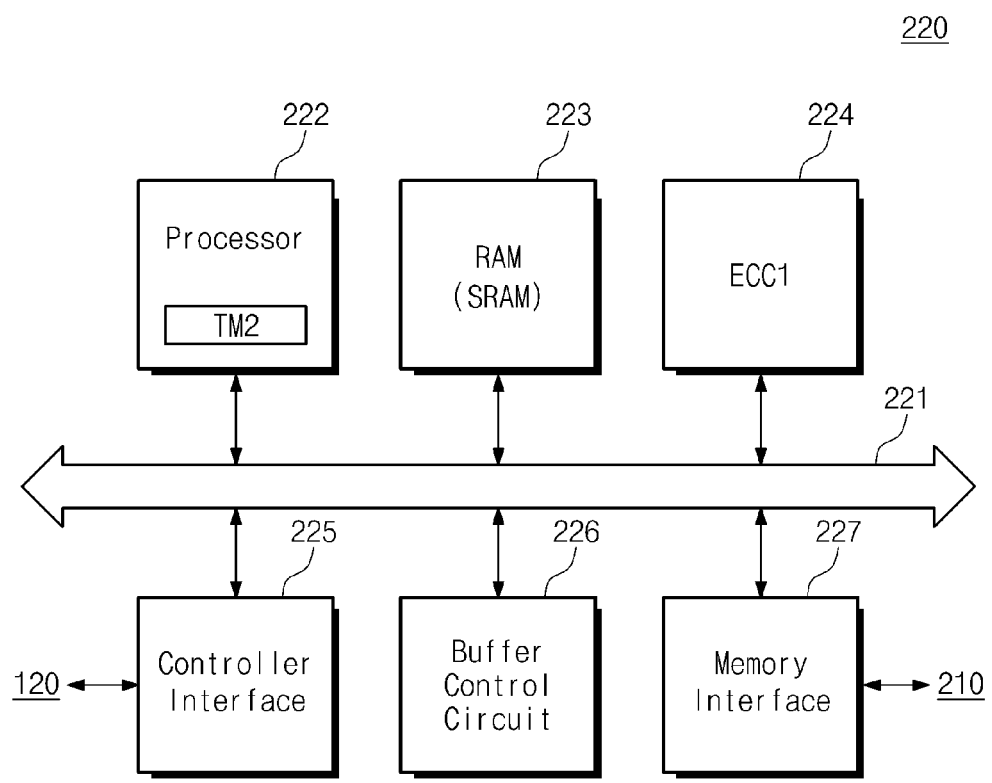
FIG. 15 is a block diagram of a cluster controller according to exemplary embodiments.

FIG. 15 is a block diagram of the cluster controller 220 according to exemplary embodiments. Referring to FIGS. 1 and 15, the cluster controller 220 includes a bus 221, a processor 222, a RAM 223, a first error correction code block (ECC1) 224, a control interface 225, a buffer control circuit 226, and a memory interface 227.

The bus 221 is configured to provide a channel between components of the cluster controller 220.

The processor 222 may control the overall operation of the memory controller 220 and perform a logical operation. The processor 222 may communicate with the controller 120 through the host interface 225, communicate with the nonvolatile memory device 210 through the memory interface 227, and communicate with the RAM 230 through the buffer control circuit 226. The processor 222 may use the RAM 223 as a working memory, a cache memory or a buffer memory to control the storage cluster 210. The processor 222 may include a second temperature manager TM2. The second temperature manager TM2 may be provided in the form of software executed by the processor 222, hardware provided as a part of the processor 222, or a combination of software and hardware.

The RAM 223 may be used as a working memory, a cache memory or a buffer memory of the processor 222. The RAM 223 may store codes and commands executed by the processor 222. The RAM 223 may store data processed by the processor 222. The RAM 223 may include a static RAM (SRAM).

The ECC1 224 may perform error correction. The ECC1 224 may perform an error correction encoding operation based on data to be written into the nonvolatile memory device 210 through the memory interface 227. Error correction encoded data may be transmitted to the nonvolatile memory device 210 through the memory interface 227. The ECC 1 224 may perform an error correction decoding operation on the data received from the nonvolatile memory device 210 through the memory interface 227. In exemplary embodiments, the ECC1 224 may be included in the memory interface 227 as a component of the memory interface 227.

The controller interface 225 may be connected to the controller 120. The controller interface 225 is configured to communicate with the controller 120 according to the control of the processor 222. The controller interface 225 may communicate with the controller 120 through the data channel and the control channel. The controller interface 225 may communicate a command latch enable signal CLE, an address latch enable signal ALE, a read enable signal /RE, a write enable signal /WE, a write protection signal /WP, a chip enable signal /CE, and a ready and busy signal R/nB through the control channel.

The buffer control circuit 226 is configured to control the RAM 230 according to the control of the processor 222.

The memory interface 227 is configured to communicate with the nonvolatile memory device 210 according to the control of the processor 222. As described with reference to FIG. 12, the memory interface 227 may communicate a command, an address, and data with the nonvolatile memory device 210 through an input/output channel. The memory interface 227 may communicate a control signal with the nonvolatile memory device 210 through a control channel. The memory interface 227 may communicate the command latch enable signal CLE, the address latch enable signal ALE, the read enable signal /RE, the write enable signal /WE, the write protection signal /WP, the chip enable signal /CE, and the ready and busy signal R/nB through the control channel.

In some exemplary embodiments, if the RAM 230 is omitted from the storage cluster 111, the buffer control circuit 226 may be omitted from the cluster controller 220.

In some exemplary embodiments, the processor 222 may control the cluster controller 220 using codes. The processor 222 may load the codes from a nonvolatile memory device (e.g., ROM) provided in the cluster controller 220. Alternatively, the processor 222 may load the codes from the nonvolatile memory device 210 through the memory interface 227.

In some exemplary embodiments, the bus 221 of the memory controller 220 may be classified into a control bus and a data bus. The data bus may be configured to transmit data in the memory controller 220, and the control bus may be configured to transmit control information such as a command and an address in the memory controller 220. The data bus and the control bus may be separated from each other so as not to interfere with each other or not to have an influence on each other. The data bus may be connected to the controller interface 225, the buffer control circuit 226, the ECC1 C 224, and the memory interface 227. The control bus may be connected to the controller interface 225, the processor 222, the buffer control circuit 226, the RAM 223, and the memory interface 227.

Figure 16:
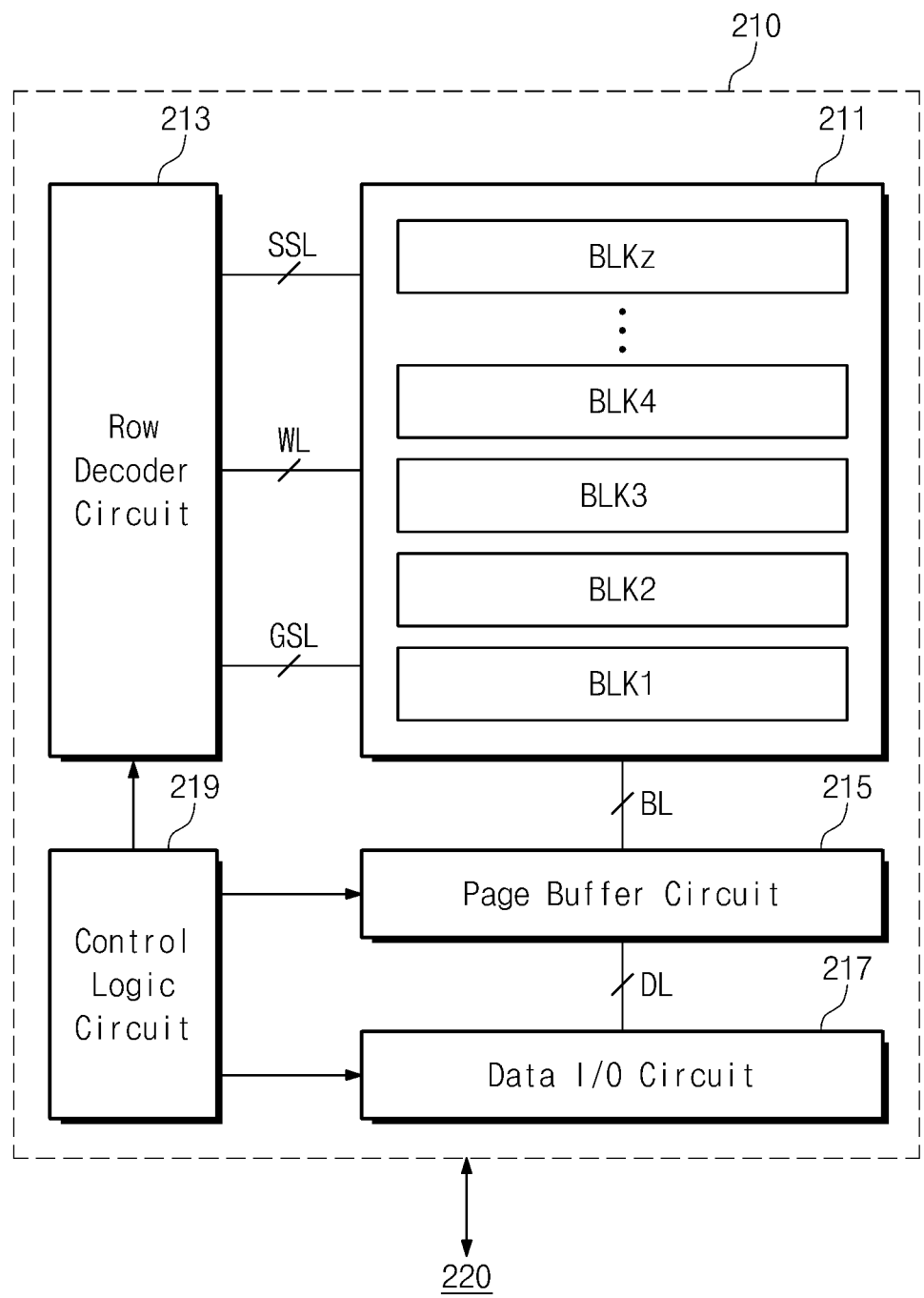
FIG. 16 is a block diagram of a nonvolatile memory device according to exemplary embodiments.

FIG. 16 is a block diagram of a nonvolatile memory device 210 according to exemplary embodiments. A single nonvolatile memory chip of the nonvolatile memory device 210 is shown in FIG. 16. However, this is only an example. As discussed above, the nonvolatile memory device 210 may include a plurality of nonvolatile memory chips in some exemplary embodiments. Referring to FIGS. 1 and 16, the nonvolatile memory device 210 includes a memory cell array 211, a row decoder circuit 213, a page buffer circuit 215, a data input/output (I/O) circuit 217, and a control logic circuit 219.

The memory cell array 211 may include a plurality of memory blocks BLK1 to BLKz. Each of the memory blocks BLK1 to BLKz includes a plurality of memory cells. Each of the memory blocks BLK1 to BLKz may be connected to the row decoder circuit 213 through at least one ground selection line GSL, a plurality of wordlines WL, and at least one string selection line SSL. Each of the memory blocks BLK1 to BLKz may be connected to a page buffer circuit 215 through a plurality of bitlines BL. The memory blocks BLK1 to BLKz may be commonly connected to the bitlines BL. Memory cells of the memory blocks BLK1 to BLKz may have the same structure. In some exemplary embodiments, each of the memory blocks BLK1 to BLKz may be a unit of an erase operation. Memory cells of the memory cell array 111 may be erased in units of a single memory block. Memory blocks belonging to a single memory block may be erased at the same time. Alternatively, in some exemplary embodiments, each of the memory blocks BLK1 to BLKz may be divided into a plurality of sub-blocks and each of the sub-blocks may be a unit of an erase operation.

The row decoder circuit 213 is connected to the memory cell array 111 through a plurality of ground selection lines GSL, a plurality of wordlines WL, and a plurality of string selection lines SSL. The row decoder circuit 213 operates according to the control of the control logic circuit 219. The row decoder circuit 213 may receive an address from the memory controller 220. The row decoder circuit 213 may decode the received address and control voltages applied to the wordlines WL according to the decoded address.

For example, during a program operation, the row decoder circuit 213 may apply a program voltage VPGM to a selected wordline of a selected memory block indicated by the address and apply a pass voltage VPASS to unselected wordlines of the selected memory block. During a read operation, the row decoder circuit 213 may apply a select read voltage VRD to the selected wordline of the selected memory block indicated by the address and apply an unselect read voltage VREAD to unselected wordlines of the selected memory. During an erase operation, the row decoder circuit 213 may apply erase voltages (e.g., a ground voltage or low voltage having similar levels to the ground voltage) to wordlines of the selected memory block indicated by the address.

The page buffer circuit 215 is connected to the memory cell array 211 through a plurality of bitlines BL. The page buffer circuit 215 is connected to the data I/O circuit 217 through a plurality of data lines DL. The page buffer circuit 215 operates according to the control of the control logic 219.

During a program operation, the page buffer circuit 215 may store the data to be programmed into the memory cells. The page buffer circuit 215 may apply voltages to a plurality of bitlines BL based on stored data. For example, the page buffer circuit 215 may function as a write driver. During a read operation, the page buffer circuit 215 may sense voltages of the bitlines BL and store a sensing result. For example, the page buffer circuit 215 may function as a sense amplifier.

The data I/O circuit 217 is connected to the page buffer circuit 215 through a plurality of data lines DL. The data I/O circuit 217 may output data read by the page buffer circuit 215 to the cluster controller 220 through an input/output channel and transmit data received from the cluster controller 220 through the input/output channel to the page buffer circuit 215.

The control logic circuit 219 may receive a command from the cluster controller 220 through the input/output channel and a control signal from the cluster controller 220 through the control channel. The control logic 219 may receive the command received through the input/output channel in response to the control signal, route an address received through the input/output channel to the row decoder circuit 213, and route the data received through the input/output channel to the data input/output circuit 217. The control logic circuit 219 may decode the received command and control the nonvolatile memory device 210 according to the decoded command.

In exemplary embodiments, during a read operation, the control logic circuit 219 may generate a data strobe signal DQS from a read enable signal /RE received from the cluster controller 220 through the control channel. The generated data strobe signal DQAS may be output to the cluster controller 220. During a write operation, the control logic circuit 219 may receive the data strobe signal DQS from the cluster controller 220 through the control channel.

FIG. 17 is a circuit diagram of a memory block BLKa according to exemplary embodiments. As illustrated, the memory block BLKa includes a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 arranged in the row direction may form a first row, and the cell strings CS21 and CS22 arranged in the row direction may form a second row. The cell strings CS11 and CS21 arranged in the column direction may form a first column, and the cell strings CS12 and CS22 arranged in the column direction may form a second column.

Each cell string may include a plurality of cell transistors. The cell transistors include a ground selection transistor GST, memory cells MC1 to MC6, and string selection transistors SSTa and SSTb. The ground selection transistor GST, the memory cells MC1 to MC6, and the string selection transistors SSTa and GSTb of each cell string may be stacked in a direction perpendicular to a plane on which the cell strings CS11 to CS21 and CS12 to CS22 are arranged in a matrix of rows and columns (e.g., a plane on a substrate of the memory block BLKa).

The plurality of cell transistors may be charge trap type transistors having threshold voltages that vary depending on the amount of charges trapped to an insulating layer.

Lowermost ground selection transistor GST may be commonly connected to the common source line CSL.

Control gates of ground selection transistors GST of the cell strings CS11 to CS21 and CS12 to CS22 may be connected to ground selection lines GSL1 and GSL2, respectively. In some exemplary embodiments, ground selection transistors of the same row may be connected to the same ground selection line, and ground selection transistors of different rows may be connected to different ground selection lines. For example, as shown in FIG. 17, ground selection transistors GST of cell strings CS11 and CS12 of a first row may be connected to a first ground selection line GSL1, and ground selection lines GST of cell strings CS21 and CS22 of a second row may be connected to a second ground selection line GSL2.

Memory cells disposed at the same height (or order) from a substrate (or from ground selection transistors GST) may be connected to a single wordline, and memory cells disposed at different heights (or orders) may be connected to different wordlines WL1 to WL6, respectively. For example, memory cells MC1 are commonly connected to the wordline WL1. Memory cells MC2 are commonly connected to the wordline WL2. Memory cells MC3 are commonly connected to the wordline WL3. Memory cells MC4 are commonly connected to the wordline WL4. Memory cells MC5 are commonly connected to the wordline WL5. Memory cells MC6 are commonly connected to the wordline WL6.

In a first string selection transistor SSTa of the same height (or order) of the cell strings CS11 to CS21 and CS12 to CS22, first string selection transistors SSTa of different rows are connected to different string selection lines SSL1a to SSL2a, respectively. For example, first string selection transistors SSTa of the cell strings CS11 and CS12 are commonly connected to a string selection line SSL1a. First string selection transistors SSTa of the cell strings CS21 and CS22 are commonly connected to a string selection line SSL2a.

In a second string selection transistor SSTb of the same height (or order) of the cell strings CS11 to CS21 and CS12 to CS22, second string selection transistors SSTb of different rows are connected to different string selection lines SSL1b to SSL2b, respectively. For example, second string selection transistors SSTb of the cell strings CS11 and CS12 are commonly connected to a string selection line SSL1b. First string selection transistors SSTb of the cell strings CS21 and CS22 are commonly connected to a string selection line SSL2b.

That is, cell strings of different rows are connected to different string selection lines. String selection transistors of the same height (or order) of the same row are connected to the same string selection line. String selection transistors of different heights (or orders) of the same row are connected to different string selection lines.

In some exemplary embodiments, string selection transistors of cell strings of the same row may be connected to a single string selection line. For example, string selection transistors SSTa and SSTb of a first row may be commonly connected to a single string selection line. String selection transistors SSTa and SSTb of cell strings CS21 and CS22 of a second row may be commonly connected to a single string selection line.

Columns of a plurality of cell strings CS11 to CS21 and CS12 to CS22 are connected to different bitlines BL1 and BL2, respectively. For example, string selection transistors SSTb of cell strings CS11 to CS21 of a first column are commonly connected to a bitline BL1. String selection transistors SST of cell strings CS12 to CS22 of a second column are commonly connected to a bitline BL2.

The cell strings CS11 and CS12 may form a first plane. The cell strings CS21 and CS22 may form a second plane.

In the memory block BLKa, memory cells of each height of each plane may form a physical page. The physical page may be write and read units of the memory cells MC1 to MC6. For example, a single plane of the memory block BLKa may be selected by the string selection lines SSL1a, SSL1b, SSL2a, and SSL2b. When the string selection lines SSL1a and SSL1b are supplied with a turn-on voltage and the string selection lines SSL2a and SSL2b are supplied with a turn-off voltage, cell strings CS11 and CS12 of the first plane are connected to the bitlines BL1 and BL2, e.g., the first plane is selected. When the string selection lines SSL2a and SSL2b are supplied with a turn-on voltage and the string selection lines SSL1a and SSL1b are supplied with a turn-off voltage, cell strings CS21 and CS22 of the second plane are connected to the bitlines BL1 and BL2. That is, the second plane is selected. In the selected plane, a single row of the memory cells MC may be selected by the wordlines WL1 to WL6. In the selected row, a select voltage may be applied to the second wordline WL2 and an unselect voltage may be applied to the other wordlines WL1 and WL3 to WL6. That is, voltages of the string selection lines SSL1a, SSL1b, SSL2a, and SSL2b and the wordlines WL1 to WL6 may be adjusted to select a physical page corresponding to the second wordline WL2 of the second plane. In the memory cells of the selected physical page, a write or read operation may be performed.

In the memory block BLKa, an erase operation may be performed in units of memory blocks or sub-blocks. When the erase operation is performed in units of memory blocks, all memory cells MC of the memory block BLKa may be erased at the same time according to a single erase request. When the erase operation is performed in units of sub-blocks, some of the memory cells MC of the memory block BLKa may be erased at the same time according to a single erase request and the others may be erase-inhibited. A wordline connected to erased memory cells MC may be supplied with a low voltage (e.g., a ground voltage or a low voltage having a similar level to the ground voltage), and a wordline connected to erase-inhibited memory cells MC may be floated.

The memory block BLKa shown in FIG. 17 is merely a non-limiting example. Exemplary embodiments are not limited to the memory block BLKa shown in FIG. 17. For example, the number of rows of cell strings may increase or decrease. As the number of the rows of the cell strings varies, the number of string selection lines or the number of ground selection lines, and the number of cell strings connected to a single bitline may also vary.

The number of columns of cell strings may increase or decrease. As the number of columns of cell strings varies, the number of bitlines connected to the columns of the cell strings and the number of cell strings connected to a single string selection line may also vary.

The height of cell strings may increase or decrease. For example, the number of ground selection transistors, memory cells or string selection transistors stacked on the respective cell strings may increase or decrease.

In some exemplary embodiments, memory cells MC that are connected to a single wordline and belong to a single row may correspond to at least three logical pages. For example, k bits (k being an integer greater than or equal to 2) may be programmed into a single memory cell. In memory cells MC that are connected to a single wordline and belong to a single row, k bits programmed into each of the memory cell MC may form k logical pages.

In some exemplary embodiments, a three-dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In some exemplary embodiments, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 18:
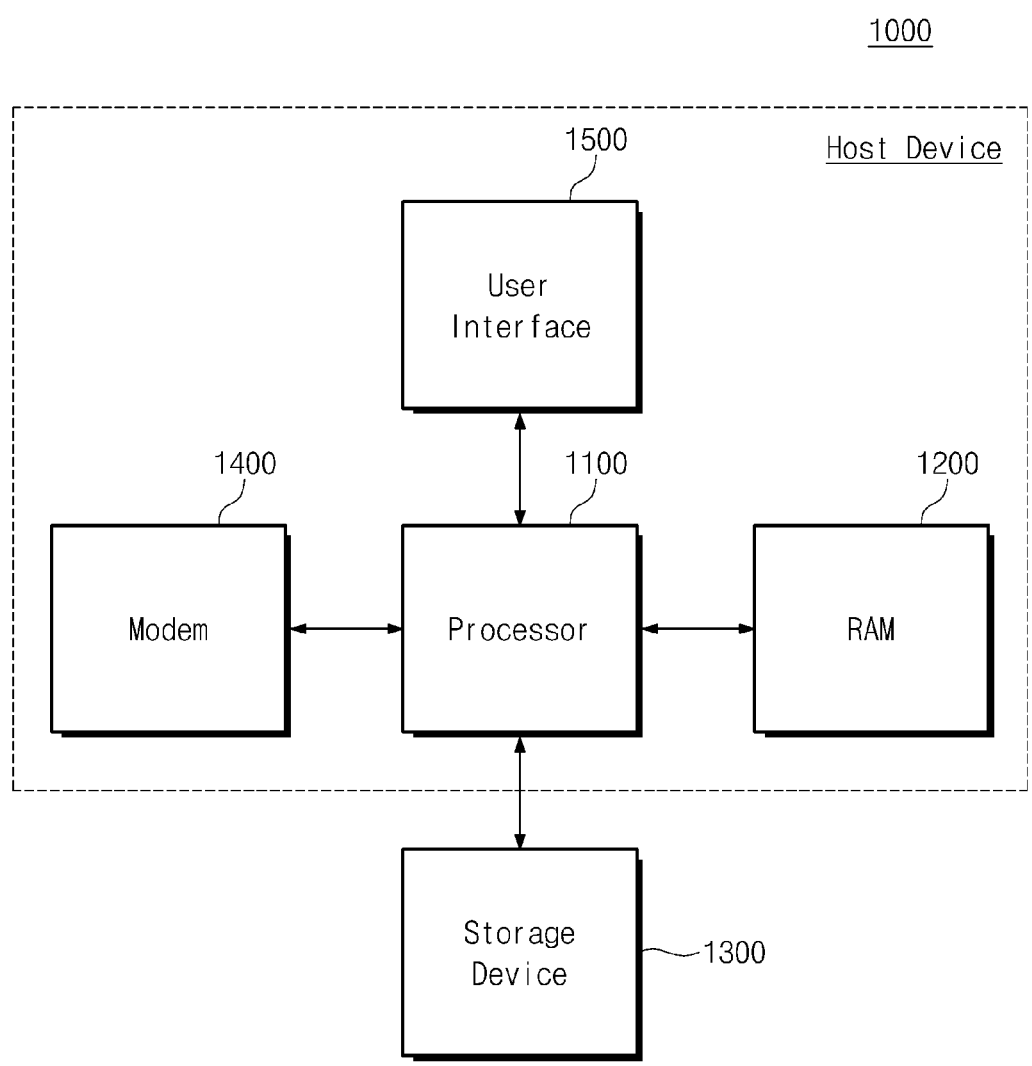
FIG. 18 is a block diagram of a computing device according to exemplary embodiments.

FIG. 18 is a block diagram of a computing device 1000 according to exemplary embodiments. As illustrated, the computing device 1000 includes a processor 1100, a RAM 1200, a storage device 1300, a modem 1400, and a user interface 1500.

The processor 1100 may control the overall operation of the computing device 1000 and performs a logical operation. For example, the processor 1100 may include a system-on-chip (SoC). The processor 1100 may be a general-purpose processor, a specific-purpose processor or an application processor.

The RAM 1200 may communicate with the processor 1100. The RAM 1200 may be a main memory of the processor 1100 or the computing device 1000. The processor 1100 may temporarily store a code or data in the RAM 1200. The processor 1100 may execute a code and process data using the RAM 1200. The processor 1100 may execute various types of software such as an operating system and an application using the RAM 1200. The processor 1100 may control the overall operation of the computing device 1000 using the RAM 1200. The RAM 1200 may include a volatile memory such as a static RAM (SRAM), a dynamic RAM (DRAM), a synchronous DRAM (SDRAM) or a nonvolatile memory such as a phase-change RAM (PRAM), a magnetic RAM (MRAM), a resistive RAM (RRAM), and a ferroelectric RAM (FRAM).

The storage device 1300 may communicate with the processor 1100. The storage device 1300 may store data for a relatively long time. That is, the processor 1100 may store data to be preserved for a relatively long time in the storage device 1300. The storage device 1300 may store a boot image to drive the computing device 1000. The storage device 1300 may store source codes of various types of software such as an operating system and an application. The storage device 1300 may store data processed as a result of the execution of various types of software such as an operating system and an application.

In some exemplary embodiments, the processor 1100 may load the source codes stored in the storage device 1300 to the RAM 1200 and execute the codes loaded to the RAM 1200 to drive the various types of software such as an operating system and an application. The processor 1100 may load the data stored in the storage device 1300 to the RAM 1200 and process the data loaded to the RAM 1200. The processor 1100 may store data that needs to be retained for a long period of time, among the data stored in the RAM 1200, in the storage device 1300.

The storage device 1300 may include a nonvolatile memory such as a phase-change RAM (PRAM), a magnetic RAM (MRAM), a resistive RAM (RRAM), and a ferroelectric RAM (FRAM). The storage device 1300 may include the storage device 100 described with reference to FIG. 1.

The modem 1400 may communicate with an external device according to the control of the processor 1100. For example, the modem 1400 may perform wired or wireless communications with an external device. The modem 1400 may perform communications based on one or more of a plurality of wireless communication techniques or protocols including, for example, LTE (Long Term Evolution), WiMax, GSM (Global System for Mobile communication), CDMA (Code Division Multiple Access), Bluetooth, NFC (Near Field Communication), WiFi, and RFID (Radio Frequency Identification), and/or one or more of a plurality of wired communication techniques or protocols including, for example, USB (Universal Serial Bus), SATA (Serial AT Attachment), SCSI (Small Computer Small Interface), Firewire, PCI (Peripheral Component Interconnection), PCIe (PCI express), NVMe (NonVolatile Memory express), UFS (Universal Flash Storage), SD (Secure Digital), SDIO, UART (Universal Asynchronous Receiver Transmitter), SPI (Serial Peripheral Interface), HS-SPI (High Speed SPI), RS232, I2C (Inter-integrated Circuit), HS-I2C, I2S, (Integrated-interchip Sound), S/PDIF (Sony/Philips Digital Interface), MMC (MultiMedia Card), eMMC (embedded MMC).

The user interface 1500 may communicate with a user according to the control of the processor 1100. For example, the user interface 1500 may include user input interfaces such as a keyboard, a keypad, a button, a touch panel, a touch screen, a touch pad, a touch ball, a camera, a microphone, a gyroscope sensor, and a vibration sensor. The user interface 1500 may include user output interfaces such as a liquid crystal display (LCD), an organic light emitting diode (OLED) display, an active matrix OLED (AMOLED), an LED, a speaker, and a monitor.

Figure 19:
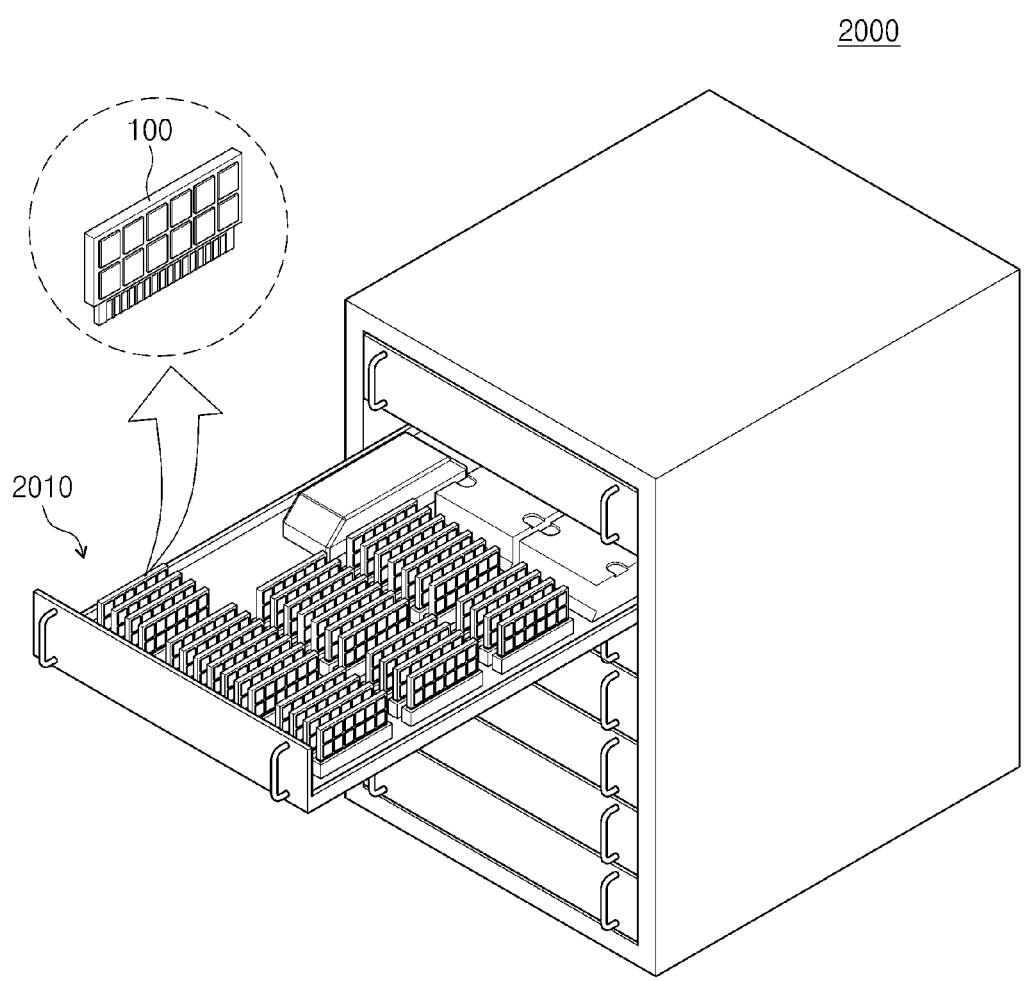
FIG. 19 illustrates an example of a server device on which a storage device according to exemplary embodiments is mounted.

FIG. 19 illustrates an example of a server device 2000 on which a storage device 100 according to exemplary embodiments is mounted. As illustrated, the server device 2000 may include two or more racks 2010. Two or more storage devices 100 may be mounted on each of the racks 2010. In some exemplary embodiments, each of the racks 2010 may mount storage devices 100 according to exemplary embodiments.

As described above, thermal leveling is performed in units of zones of storage clusters. Among the storage clusters, only a hot storage cluster is controlled in a slow mode and the other storage clusters are maintained in a normal mode. Thus, a storage device with improved speed is provided.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of the inventive concepts is to be determined by the broadest reasonable interpretation of the following claims and their equivalents, and shall not be restricted or limited by the foregoing detailed description. While some exemplary embodiments have been particularly shown and described, it will be understood by one of ordinary skill in the art that variations in form and detail may be made therein without departing from the spirit and scope of the claims.

What is claimed is:

1. A storage device comprising:
   storage clusters; and
   a controller configured to receive a command and an address from an external host device, select one of the storage clusters according to the received address, and transmit the received command and the received address to the selected storage cluster, wherein the controller is configured to control the storage clusters as normal storage clusters and slow storage clusters according to temperature of zones to which the storage clusters belong.

2. The storage device as set forth in claim 1, wherein the controller is configured to control at least one storage cluster belonging to a zone as a slow storage cluster when a temperature of the zone is greater than or equal to a threshold temperature, and control the at least one storage cluster belonging to the zone as a normal storage cluster when the temperature of the zone is lower than the threshold temperature.

3. The storage device as set forth in claim 1, wherein the controller is configured to transmit the received command and the received address to a normal storage cluster when the received command is a write command and the received address indicates a slow storage cluster.

4. The storage device as set forth in claim 3, wherein the controller is configured to replace the received address indicating the slow storage cluster and an address assigned to a free storage space of the normal storage cluster with each other.

5. The storage device as set forth in claim 3, wherein the controller is configured to select a storage cluster from among the storage clusters to which to transmit the write command and the received address according to a number of erasures of the normal clusters.

6. The storage device as set forth in claim 1, wherein the controller is configured to migrate hot data stored in the slow storage clusters to the normal storage clusters.

7. The storage device as set forth in claim 1, wherein each of the storage clusters comprises a temperature sensor, and
the controller is configured to detect the temperatures of the zones to which the storage clusters belong from the temperature sensors of the storage clusters.

8. The storage device as set forth in claim 7, wherein the controller is configured to adjust the zones according to temperatures of the storage clusters.

9. The storage device as set forth in claim 8, wherein the controller is configured to divide storage clusters belonging to a zone into separate zones when a difference between temperatures of the storage clusters that belong to the zone is greater than or equal to a threshold value.

10. The storage device as set forth in claim 8, wherein the controller is configured to merge at least two zones into a single zone when a difference between temperatures of the storage clusters belonging to the at least two zones is less than or equal to a threshold value.

11. The storage device as set forth in claim 1, wherein the controller is configured to set zones according to estimated temperature information of the storage clusters.

12. The storage device as set forth in claim 11, wherein the controller is configured to adjust estimated temperature information of each storage cluster according to a variation of power consumption of each storage cluster.

13. The storage device as set forth in claim 1, wherein each of the storage clusters comprises:
nonvolatile memory devices; and
a cluster controller configured to translate the address received from the controller into a physical address of a nonvolatile memory device of the nonvolatile memory devices and to access the nonvolatile memory device indicated by the physical address in response to the command.

14. The storage device as set forth in claim 13, wherein the nonvolatile memory devices comprise semiconductor chips stacked on a printed circuit board, and
the cluster controller is configured to divide the semiconductor chips into vertical zones according to height of the semiconductor chips from the printed circuit board and to control the semiconductor chips as normal semiconductor chips and slow semiconductor chips according to temperatures of the vertical zones.

15. A storage device comprising:
storage clusters; and
a controller configured to receive a command and an address from an external host device, select one of the storage clusters according to the received address, and transmit the received command and the received address to the selected storage cluster,
wherein each of the storage clusters comprises:
nonvolatile memory devices; and
a cluster controller configured to translate the address received from the controller into a physical address of a nonvolatile memory device of the nonvolatile memory devices and to access the nonvolatile memory device indicated by the physical address in response to the command, and
wherein the controller is configured to divide the storage controllers into zones, control at least one storage cluster belonging to a zone as a slow storage cluster when temperature of the zone is greater than or equal to a threshold temperature, and control at least one storage cluster belonging to a zone as a normal storage cluster when the temperature of the zone is less than the threshold temperature.

16. A storage device comprising:
a plurality of storage clusters arranged in a plurality of cluster zones; and
a controller configured to monitor a temperature of each cluster zone to detect a hot cluster zone, and to control at least one storage cluster belonging to the hot cluster zone as a slow storage cluster.

17. The storage device as set forth in claim 16, wherein the controller is configured to determine whether a storage cluster being controlled as a slow storage cluster has cooled down, and to control the storage cluster that has cooled down as a normal storage cluster.

18. The storage device as set forth in claim 16, wherein the controller is configured to remap an address indicating the slow storage cluster to an address assigned to a free storage space of a normal storage cluster.

19. The storage device as set forth in claim 16, wherein each storage cluster comprises a temperature sensor, and the storage clusters are arranged in the plurality of cluster zones based on temperature information from the temperature sensors.

20. The storage device as set forth in claim 16, wherein the hot cluster zone is detected when an average temperature of storage clusters belonging to a cluster zone is greater than or equal to a threshold temperature.

* * * * *